United States Patent
DeAngelis et al.

(10) Patent No.: US 10,420,981 B2
(45) Date of Patent: Sep. 24, 2019

(54) SYSTEMS AND METHODS FOR ANALYZING EVENT DATA

(71) Applicant: IsoLynx, LLC, Haverhill, MA (US)

(72) Inventors: Douglas J. DeAngelis, Ipswich, MA (US); Kirk M. Sigel, Ithaca, NY (US); Edward G. Evansen, West Newbury, MA (US)

(73) Assignee: ISOLYNX, LLC, Haverhill, MA (US)

( * ) Notice: Subject to any disclaimer, the term of this patent is extended or adjusted under 35 U.S.C. 154(b) by 0 days.

(21) Appl. No.: 15/816,849

(22) Filed: Nov. 17, 2017

(65) Prior Publication Data

US 2018/0071579 A1 Mar. 15, 2018

Related U.S. Application Data

(63) Continuation of application No. 14/968,064, filed on Dec. 14, 2015, now Pat. No. 9,849,334, which is a
(Continued)

(51) Int. Cl.
*A63B 24/00* (2006.01)
*H04N 5/262* (2006.01)
(Continued)

(52) U.S. Cl.
CPC ...... *A63B 24/0021* (2013.01); *G06K 9/00724* (2013.01); *H04N 5/262* (2013.01);
(Continued)

(58) Field of Classification Search
CPC .......... A63B 24/0021; A63B 2243/007; A63B 2225/54; A63B 2225/20; A63B 2220/806;
(Continued)

(56) References Cited

U.S. PATENT DOCUMENTS 3,047,861 A 7/1962 Arnold et al.
3,518,674 A 6/1970 Moorehead et al.
(Continued)

FOREIGN PATENT DOCUMENTS

EP 0385600 9/1990
GB 890497 2/1962
(Continued)

OTHER PUBLICATIONS

First Examination Report dated Mar. 1, 2017, corresponding to New Zealand Patent Application No. 716581.
(Continued)

*Primary Examiner* — Allen C Wong
(74) *Attorney, Agent, or Firm* — Lathrop Gage LLP

(57) ABSTRACT

A computer-implemented method for determining a target situation in an athletic event. Positional information including the relative positions of a group of selected participants is initially received from a tracking system, and the aggregate motion of the selected participants is detected in real-time using the positional information. The target situation may be determined to have occurred when a change in the aggregate motion occurs in accordance with a predetermined characteristic during an initial time interval.

10 Claims, 14 Drawing Sheets

Related U.S. Application Data continuation of application No. 14/330,838, filed on Jul. 14, 2014, now Pat. No. 9,216,319.

(60) Provisional application No. 61/292,386, filed on Jan. 5, 2010.

(51) Int. Cl.
*G06K 9/00* (2006.01)
*G01S 13/87* (2006.01)

(52) U.S. Cl.
CPC ... *A63B 2024/0025* (2013.01); *A63B 2220/10* (2013.01); *A63B 2220/30* (2013.01); *A63B 2220/806* (2013.01); *A63B 2225/20* (2013.01); *A63B 2225/54* (2013.01); *A63B 2243/007* (2013.01); *G01S 13/878* (2013.01)

(58) Field of Classification Search
CPC ............ A63B 2220/30; A63B 2220/10; A63B 2024/0025; G06K 9/00724; G01S 13/878; H04N 5/262
USPC ......................................................... 348/157
See application file for complete search history.

(56) References Cited

U.S. PATENT DOCUMENTS

| | | | |
|---|---|---|---|
| 4,215,345 | A | 7/1980 | MacDoran |
| 5,363,297 | A | 11/1994 | Larson et al. |
| 5,374,936 | A | 12/1994 | Feng |
| 6,661,342 | B2 | 12/2003 | Hall |
| 6,710,713 | B1 | 3/2004 | Russo |
| 6,882,315 | B2 | 4/2005 | Richley et al. |
| 6,998,987 | B2 | 2/2006 | Lin |
| 7,511,604 | B2 | 3/2009 | Raphaeli et al. |
| 7,667,604 | B2 | 2/2010 | Ebert et al. |
| 7,671,802 | B2 | 3/2010 | Walsh et al. |
| 7,710,322 | B1 | 5/2010 | Ameli et al. |
| 7,969,348 | B2 | 6/2011 | Baker et al. |
| 8,169,319 | B2 | 5/2012 | Kaplan et al. |
| 8,289,185 | B2 | 10/2012 | Alonso |
| 8,457,392 | B2 | 6/2013 | Cavallaro et al. |
| 8,477,046 | B2 | 7/2013 | Alonso |
| 8,768,343 | B2 | 7/2014 | Wisherd |
| 8,842,002 | B2 | 9/2014 | Rado |
| 2002/0041284 | A1 | 4/2002 | Konishi et al. |
| 2002/0116147 | A1 | 8/2002 | Vock et al. |
| 2003/0095186 | A1 | 5/2003 | Aman et al. |
| 2003/0163287 | A1 | 8/2003 | Vock |
| 2004/0006424 | A1 | 1/2004 | Joyce |
| 2004/0178955 | A1 | 9/2004 | Menache |
| 2005/0018045 | A1 | 1/2005 | Thomas et al. |
| 2005/0037826 | A1 | 2/2005 | Rupert et al. |
| 2005/0207617 | A1 | 9/2005 | Sarnoff |
| 2006/0152303 | A1 | 7/2006 | Liang |
| 2006/0160488 | A1 | 7/2006 | Sueoka |
| 2006/0247808 | A1 | 11/2006 | Robb |
| 2006/0258457 | A1 | 11/2006 | Brigham |
| 2007/0126558 | A1 | 6/2007 | Donato |
| 2007/0134639 | A1 | 6/2007 | Sada et al. |
| 2007/0135243 | A1 | 6/2007 | Lerue et al. |
| 2007/0279494 | A1 | 12/2007 | Aman et al. |
| 2007/0290801 | A1 | 12/2007 | Powell |
| 2008/0016534 | A1 | 1/2008 | Ortiz et al. |
| 2008/0089666 | A1 | 4/2008 | Aman |
| 2008/0109848 | A1 | 5/2008 | Li et al. |
| 2008/0129825 | A1* | 6/2008 | DeAngelis ......... A63B 24/0021 348/169 |
| 2008/0140233 | A1 | 6/2008 | Seacal |
| 2008/0192116 | A1 | 8/2008 | Tamir et al. |
| 2009/0015677 | A1 | 1/2009 | Harrington |
| 2009/0048039 | A1 | 2/2009 | Holthouse |
| 2009/0060352 | A1 | 3/2009 | Distante et al. |
| 2009/0079580 | A1 | 3/2009 | Kaplan et al. |
| 2009/0150965 | A1 | 6/2009 | Christianen et al. |
| 2009/0189982 | A1* | 7/2009 | Tawiah .................. A63F 13/65 348/157 |
| 2009/0199761 | A1 | 8/2009 | Ramirez |
| 2009/0231198 | A1 | 9/2009 | Walsh et al. |
| 2009/0315978 | A1 | 12/2009 | Wurmlin et al. |
| 2010/0026809 | A1 | 2/2010 | Curry |
| 2010/0184563 | A1 | 7/2010 | Molyneus |
| 2010/0283630 | A1 | 11/2010 | Alonso |
| 2011/0013836 | A1 | 1/2011 | Gefen et al. |
| 2011/0054782 | A1 | 3/2011 | Kaahui |
| 2011/0084806 | A1 | 4/2011 | Perkins |
| 2011/0135149 | A1 | 6/2011 | Gefen |
| 2011/0205022 | A1 | 8/2011 | Cavallaro |
| 2013/0066448 | A1 | 3/2013 | Alonso |
| 2013/0096704 | A1 | 4/2013 | Case, Jr. |

FOREIGN PATENT DOCUMENTS

| | | |
|---|---|---|
| WO | WO1998005977 | 2/1998 |
| WO | WO2001008417 | 2/2001 |
| WO | WO2008070687 | 6/2008 |
| WO | WO2014197600 | 12/2014 |

OTHER PUBLICATIONS

European Search Report corresponding to European Patent Application No. 15188180, dated Mar. 8, 2016.

Fraunhofer IIS 2010 Annual Report at 83 available at: http://www.eas.iis.fraunhofer.de/content/dam/eas/de/documents/jahresbericht/JB10_engl_low_res_tcm_182-91049.pdf.

InMotio—Tactical, Training and Performance Management video, (2011) available at: https://www.youtube.com/watch?v=dg1n7IYePJI).

International Search Report corresponding to International Patent Application No. PCT/CZ97/00027, dated Nov. 14, 1997.

International Search Report with Written Opinion corresponding to International Patent Application No. PCT/US2011/020232, dated Apr. 25, 2011.

IsoLynx Real-Time Player Tracking & Game Analysis Technology (2010) available at: http://web.archive.org/web/20100604012151/http://www.finishlynx.com/isolynx/.

Notice of Acceptance corresponding to Australian Patent Application No. 20011203707, dated Jan. 6, 2016.

Patent Examination Report corresponding to Australian Patent Application No. 2016200633, dated Sep. 14, 2016.

Patent Examination Report corresponding to Australian Patent Application No. 2011203707, dated Jul. 17, 2015.

U.S. Appl. No. 12/985,036 select file history dated Jul. 18, 2013 through Mar. 4, 2014.

Zebra Intros Next-Gen RTLS Leveraging Ultra-Wideband Technology, RFID Journal (2010) available at: http://www.rfidjournal.com/articles/view?7889.

U.S. Appl. No. 14/330,838 select file history dated Jul. 14, 2014 through Dec. 22, 2015.

European Patent Application No. 18197792.7; Extended European Search Report dated Dec. 10, 2018; 8 pgs.

Australian Patent Application No. 2017268619; Examination Report No. 1 dated Nov. 13, 2018; 3 pgs.

European Patent Application No. 15188180.2—Communication pursuant to Article 94(3) EPC dated Feb. 8, 2018; 6 pgs.

Changsheng Xu et al. (2009), "Sports Video Analysis: Semantics Extraction, Editorial Content Creation and Adaptation", Journal of Multimedia, Apr. 1, 2009 (Apr. 1, 2009).

Fawcett et al. (2009), "Rich Immersive Sports Experience; A Hybrid Multimedia System for Content Consumption", Consumer Communications and Networking Conference, 2009. CCNC 2009. 6th IEEE, IEEE, Piscataway, NJ, USA, Jan. 10, 2009 (Jan. 10, 2009), pp. 1-5.

New Zealand Patent Application No. 731883; Further Examination Report dated Jan. 25, 2018; 1 pg.

(56) References Cited

OTHER PUBLICATIONS

Canadian Patent Application No. 2956821; Requisition by Examination dated Dec. 6, 2017; 4 pgs.

* cited by examiner

SYSTEMS AND METHODS FOR ANALYZING EVENT DATA

RELATED APPLICATIONS

This application is a continuation of U.S. patent application Ser. No. 14/968,064, filed Dec. 14, 2015, which is a continuation of U.S. patent application Ser. No. 14/330,838, filed Jul. 14, 2014, now U.S. Pat. No. 9,216,319, which is a continuation of U.S. patent application Ser. No. 12/985,036, filed Jan. 5, 2011, now U.S. Pat. No. 8,780,204, which claims the benefit of priority to U.S. Patent Application Ser. No. 61/292,386, filed Jan. 5, 2010. Each of the aforementioned applications is incorporated herein by reference.

BACKGROUND

Systems that track objects in an event, such as participants in an athletic event, are known. For example, U.S. Patent Application Publication No. 2008/0129825 to DeAngelis et al., which is incorporated herein by reference, discloses systems and methods to facilitate autonomous image capture and picture production. A location unit is attached to each tracked object (e.g., participants in an athletic event). An object tracking device receives location information from each location unit. A camera control device controls, based upon the location information, at least one motorized camera to capture image data of at least one tracked object.

It is also known to manually create video and still images of an event. For example, a video feed of an event (e.g., an American football game) is typically generated by highly trained camera persons and highly trained production staff who select camera shots and combine graphics into the video feed. Video images and/or still picture production can be partially or fully automated using systems and methods disclosed in U.S. Patent Application Publication No. 2008/0129825.

In many American football games, two 'standard' views are manually filmed using two digital video cameras; one on the sideline, and one in an end zone. These views are then manually 'broken down' by humans watching the videos, clipping them into plays, and identifying interesting attributes of each play. One of the most obvious attributes is simply who was on the field for each team at a given time. This is also one of the most difficult things to determine from the video since the resolution is not sufficient to clearly determine each of the players' numbers, thus making it difficult to identify all of the players.

SUMMARY

A computer-implemented method is disclosed for determining a target situation in an athletic event. In one embodiment, positional information including the relative positions of a group of selected participants is initially received from a participant tracking system. Aggregate motion of the selected participants is detected in real-time using the positional information. The target situation is determined to have occurred when a change in the aggregate motion occurs in accordance with a predetermined characteristic during an initial time interval.

In another embodiment, a video feed of an event is annotated by receiving positional information indicating the position of a selected participant in the event from a tracking system. The path of travel of the participant is determined from the positional information, and graphical information indicating the path of travel, and information identifying the participant, is overlaid onto the video feed.

DETAILED DESCRIPTION

Figure 1:
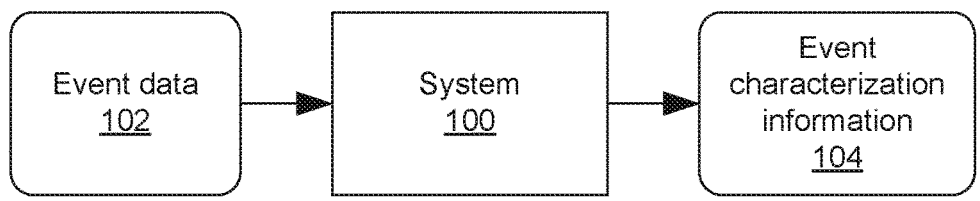
FIG. 1 shows an exemplary system for automatically generating event characterization information from event data.

The present disclosure may be understood by reference to the following detailed description taken in conjunction with the drawings described below. It is noted that, for purposes of illustrative clarity, certain elements in the drawings may not be drawn to scale.

Systems and methods disclosed herein analyze event data, such as respective real-time locations of participants in an event, to advantageously automatically generate information characterizing one or more aspects of the event (event characterization information). In the case of a sporting event, examples of possible event characterization information include (1) identification of formations and/or plays, (2) beginning and/or end of a play, (3) players' paths of travel, (4) lines of scrimmage, (5) identification of players, and (6) position and orientation of coaches and/or officials.

Such event characterization information, for example, is provided to interested recipients (e.g., event spectators, coaches, and/or event officials) automatically or upon demand. In some embodiments, event characterization information is advantageously used to enhance a video feed 109 of an event, such as by overlaying graphical information onto the video feed. Some embodiments of the systems and methods disclosed herein may partially or fully automate imaging of an event (e.g., generating a video feed of the event) and/or control delivery of event images to recipients.

The present system and methods provide the basic functionality for implementing, among other things, a real-time feed showing who is on a playing field at all times. The feed can be automatically added as a data track to the original digital video.

FIG. 1 shows an exemplary system 100 for automatically generating event characterization information from event data. System 100 receives a video feed (live video stream) 109 and other event data 102, which includes information such as participant location information and system instructions 116, and automatically generates event characterization information 104. Exemplary embodiments of system 100 are operable to automatically generate event characterization information 104 in real-time, where the term "real-time" in the context of this disclosure and appended claims means information 104 is generated as the event occurs. For example, identification of a play in a sporting event in real-time means that the play is identified as it occurs, as opposed to the play being identified at a later time (e.g., upon post-analysis of the event).

Figure 2:
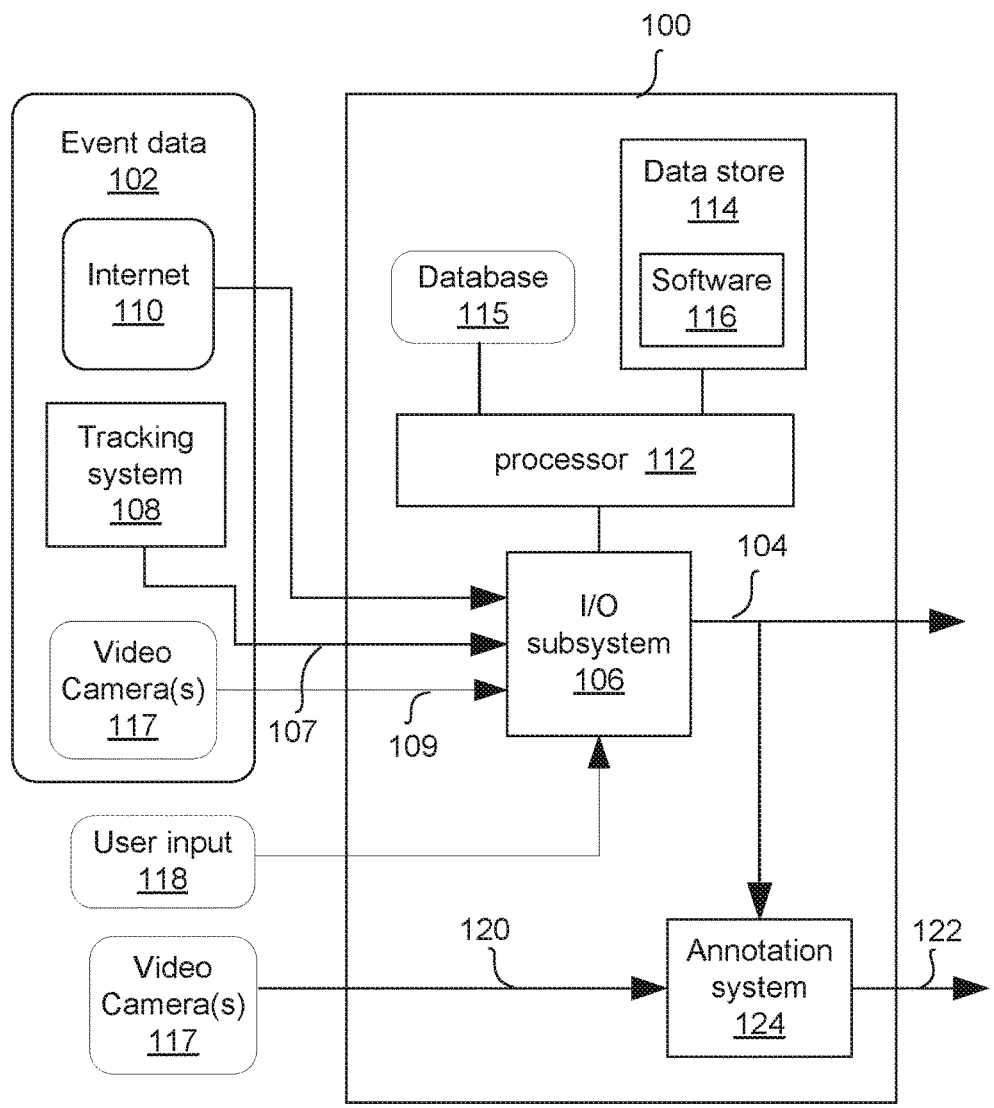
FIG. 2 shows the system of FIG. 1 in greater detail.

FIG. 2 shows exemplary system 100 in more detail. System 100 includes an input/output (I/O) subsystem 106 operable to receive event data 102 and user input 118, and to output event characterization information 104. I/O subsystem 106 includes, for example, a USB (Universal Serial Bus) and/or Ethernet interface for connecting to one or more external systems. It is to be noted that input 118 is received from a system user to initiate and/or provide certain information specific to each of the system functions described below.

In one embodiment, I/O subsystem 106 is communicatively coupled to a video feed 109 from one or more video cameras 117, and a tracking system 108, information from which is transmitted via link 107, which also provides data including information pertaining to event participants and instructions for system 100 including requests to be processed. Video cameras 117 may be manually or robotically controlled. Tracking system 108 determines positions and/or velocities of event participants from location units such as active RFID tags affixed to event participants by triangulating the position of the location units to determine respective positions and/or velocities of the participants. System 100 may alternatively receive event data 102 from Internet 110 via I/O subsystem 106.

In the present embodiment, system 100 further includes a processor 112, a data store 114, and a database 115. Processor 112 is a computing device, which includes, for example, a general purpose microprocessor, processes event data 102 to generate event characterization information 104 in response to instructions 116, in the form of software and/or firmware 116, stored in data store 114. Examples of methods executed by processor 112 to generate event characterization information 104 are discussed below.

Data store 114 typically includes volatile memory (e.g., dynamic random access memory) and one or more hard drives. Although the components of system 100 are shown grouped together, such components could be spread over a number of systems, such as in a distributed computing environment and/or in a distributed storage environment.

In one embodiment, event characterization information 104 is transmitted to an annotation system 124, which annotates a video feed 120 (e.g., a live video feed) of the event to produce an annotated video feed 122. In certain embodiments, annotation system 124 overlays graphical information onto video feed 120, as is known in the art, and the graphical information includes event characterization information 104.

The present system advantageously uses information derived from the aggregate motion of event participants. The aggregate motion of multiple participants in an event can indicate the occurrence of a particular incident, target situation, or circumstance of interest (hereinafter collectively, "target situation") in the event (e.g., the beginning of a play in a sporting event). An aggregate motion value represents collective motion of two or more participants. An aggregate motion value for selected event participants at a given point in time can be determined, for example, by summing the velocities of the participants at that time or determining an average velocity of the participants at that time. A particular target situation can be detected by recognizing changes in aggregate motion values and/or sequences of aggregate motion values that are known to coincide with the target situation, thereby indicating that the target situation occurred.

Figure 3:
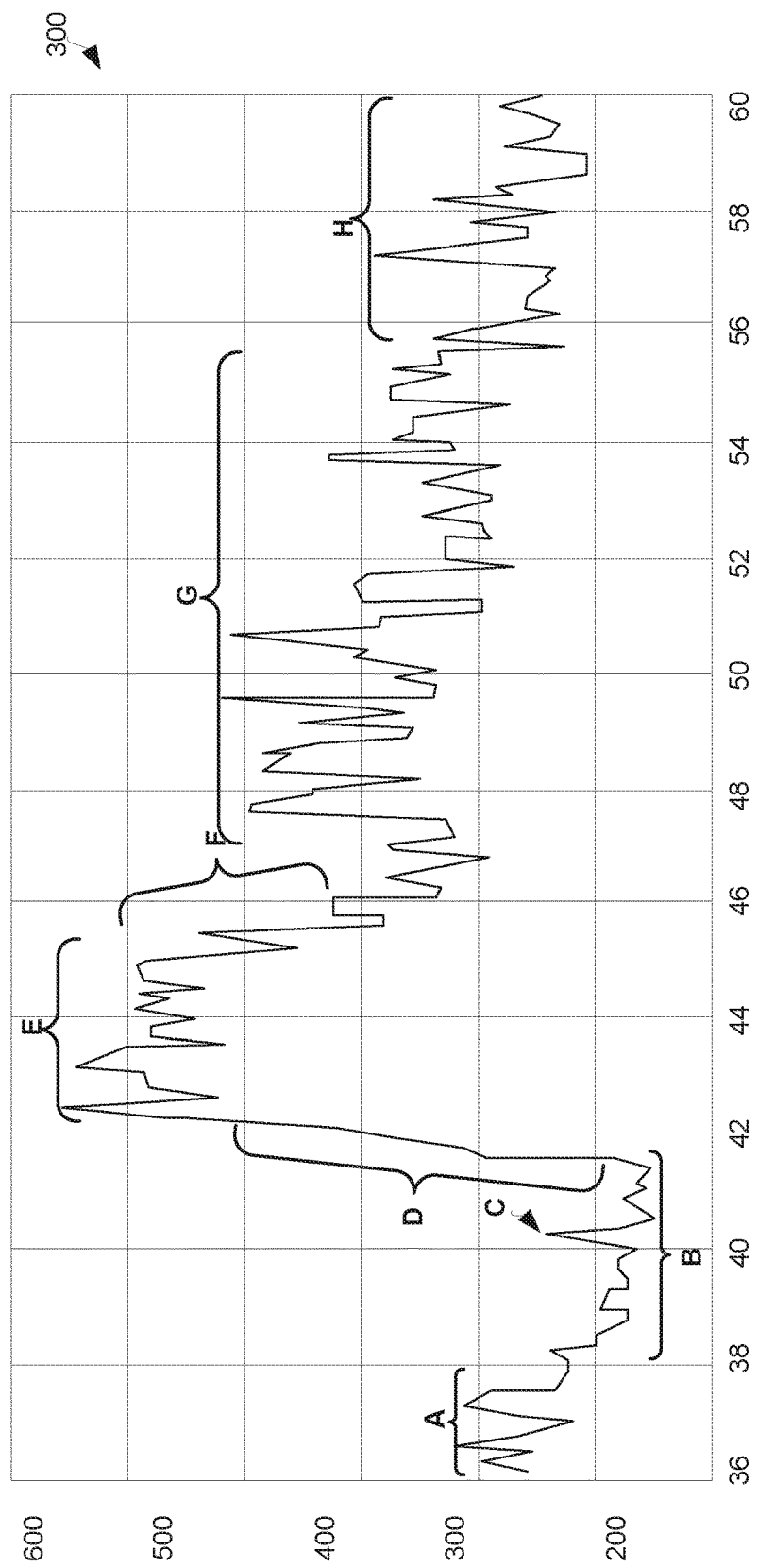
FIG. 3 shows an example in which aggregate motion of event participants is used to determine the occurrence of a particular target situation in an event.

FIG. 3 shows an example in which aggregate motion of event participants and knowledge of the type of event can be used to determine the occurrence of a particular target situation in the event. More specifically, FIG. 3 is a graph 300 of normalized aggregate motion versus time for a 24 second interval of an American football game. Certain target situations in a football game can be recognized by comparing actual aggregate motion values of graph 300 to aggregate motion values known to occur with a given target situation. For example, segments A, B, D, and E are respectively characterized by a moderate value of aggregate motion, a small value of aggregate motion, a large increase in aggregate motion over a defined time duration, and a sustained large value of aggregate motion. Such sequences of aggregate motion values are known to occur with the preparation for and executing of an offensive play, and the beginning of an offensive play can thus be inferred from the sequence.

Specifically, segment A represents the offensive squad breaking a huddle and heading toward a line of scrimmage, segment B represents an offensive squad assembling at a line of scrimmage and entering a pre-play condition, segment D represents a beginning of a play, and segment E represents the play in progress. Accordingly, an offensive play can be detected by recognizing the sequence of aggregate motion values associated with segments A, B, D, and E. Point C, which is characterized by a brief spike in aggregate motion, represents a player going into motion before the ball was snapped.

A sequence of aggregate motion values in graph 300 can also be recognized to determine an end of the play. In particular, segments E, F, G, and H are respectively characterized by a sustained large value of aggregate motion, a substantial decrease in aggregate motion over a defined time duration, a moderate value of aggregate motion, and moderate but smaller value of aggregate motions. Such sequence of aggregate motion values are known to occur with the ending of a play. In particular, segment E represents the play in progress (as previously noted), segment F represents the end of the play, segment G represents the players moving from the post play positions back to the next huddle, and segment H represents players beginning to assemble for the next huddle.

Accordingly, certain embodiments of system 100 at least partially determine event characterization information 104 from aggregate motion of participants of the event, such as by processor 112 executing instructions 116 to perform an analysis similar to that discussed above with respect to FIG. 3.

Figure 4A:
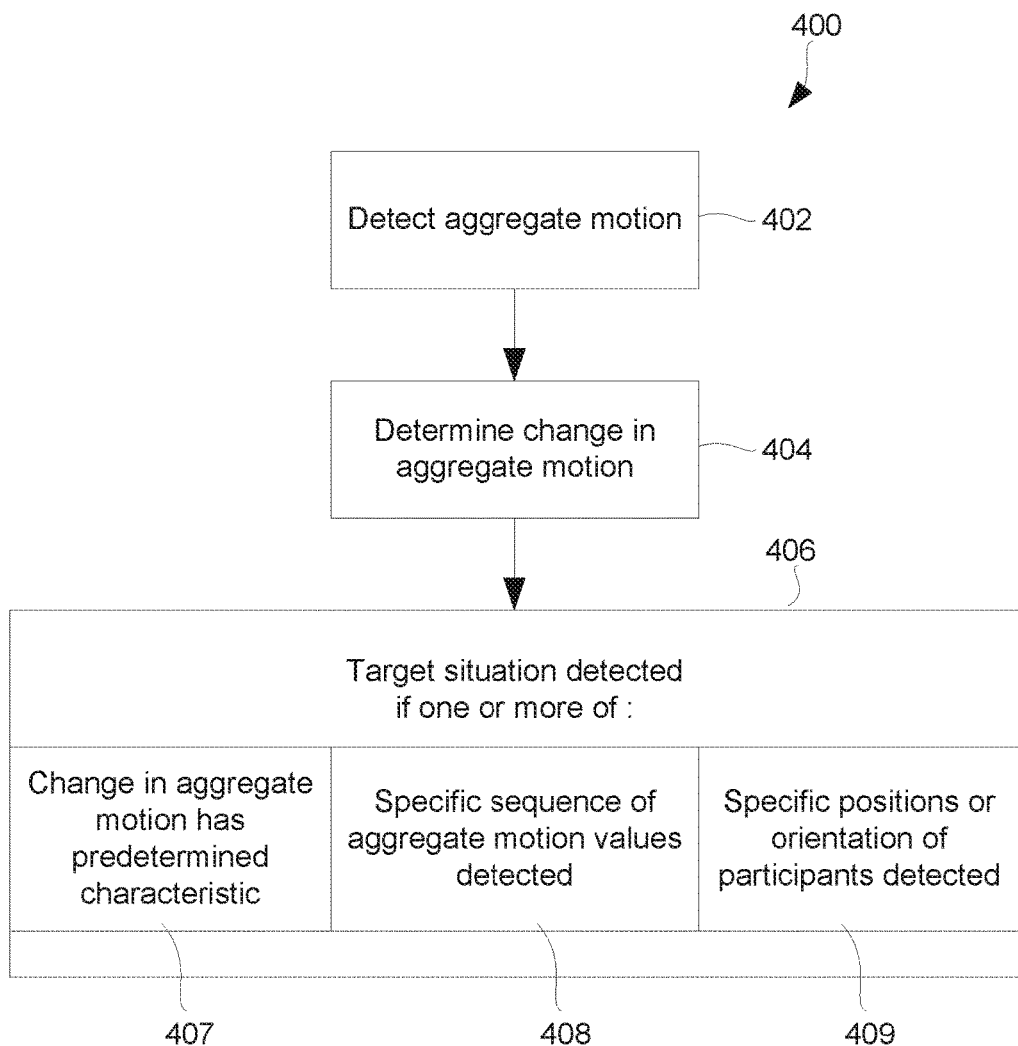
FIG. 4A shows an exemplary method that is used with certain embodiments to detect a target situation in an event by analyzing the aggregate motion of participants in the event.

FIG. 4A shows an exemplary method 400 that can be used with certain embodiments of system 100 to detect a target situation in an event by analyzing the aggregate motion of participants in the event in real-time. Method 400 is performed, for example, by processor 112 of system 100 executing instructions 116. As shown in FIG. 4A, in step 402, aggregate motion of a number of participants of the event is detected, such as by processor 112 calculating an average velocity of selected participants in the event from velocity data calculated from event data 102. Processor 112 may calculate respective participant velocities from changes in participant positions and then determine an average velocity from the respective participant velocities. Calculated aggregate motion values may be stored in database 115 for subsequent use.

In step 404, a change in aggregate motion is determined. For example, processor 112 may determine a difference between two sequentially determined aggregate motion values stored in database 115. In step 406 a target situation is detected if the change in aggregate motion detected in step 404 has a predetermined characteristic (block 407), and/or if a specific sequence of aggregate motion values detected (block 408), and/or if specific positions or orientation of event participants is detected (block 409).

For example, with respect to block 407, processor 112 may detect the beginning of a sporting event play if the change in aggregate motion meets a predetermined increases by at least a threshold value within a given time period as specified by instructions 116, such as similar to the increase shown in segment D of graph 300 (FIG. 3). As another example of step 406, processor 112 may detect an end of the sporting event play if aggregate motion decreases by at least a threshold value within a given time period as specified by instructions 116, such as a value similar to the decrease that occurred in segment F of graph 300.

In block 408, a specific sequence of aggregate motion values must occur before a target situation is determined to be detected. For example, detection of a play beginning may require a minimum aggregate motion value to precede a rapid increase in aggregate motion values and/or a maximum sustained aggregate motion value to follow the rapid increase, similar to sequences B, D and D, E of FIG. 3, respectively. As another example, detection of a play ending may require a maximum sustained aggregate motion value to precede a rapid decrease in aggregate motion values and/or a moderate aggregate motion value to following the rapid decrease, similar to sequences E, F, and F, G of FIG. 3, respectively.

In block 409, event data 102 must have certain characteristics in addition to known aggregate motion characteristics to detect a target situation. Examples of such additional characteristics include positions and/or orientation of participants relative to each other or relative to a playing field. In the case of a football game, the beginning of a play may be detected if a certain number of players are in certain predetermined positions indicating formation of a starting line prior to a sufficiently rapid increase (e.g., 6 feet/second minimum aggregate speed in a 0.3 second period) in aggregate motion values.

The choice of the specific participants to be considered when determining the aggregate motion value in step 402 depends on the specific intended application of method 400. For example, in the case of American football, only the players on one team might be considered when determining an aggregate motion value. As another example, only players considered likely to be involved in a high level of motion during a particular target situation, such as running backs, receivers, and quarterbacks, may be considered when determining an aggregate motion value. The specific participants considered when determining an aggregate motion value may vary depending on the target situation to be detected or determined. For example, different players may be considered in aggregate motion determinations when detected in the beginning of an offensive play and the kicking of a field goal.

Figure 4B:
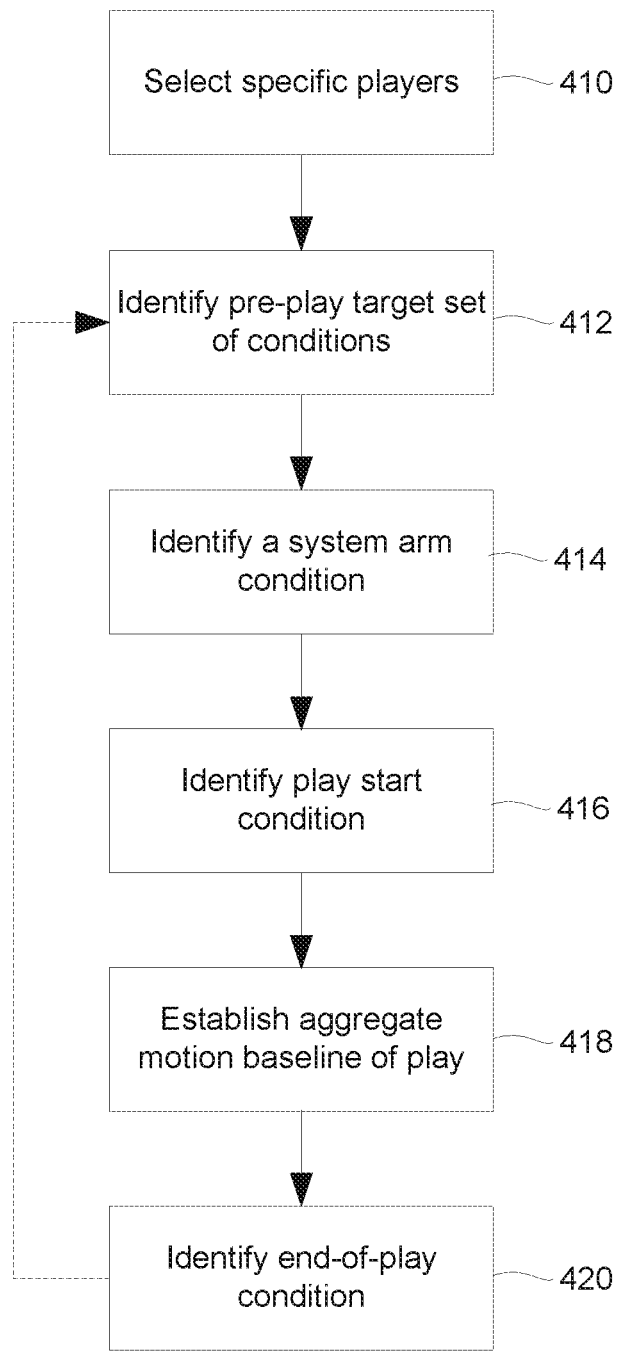
FIG. 4B is a flowchart showing exemplary steps performed in detecting a play in a sporting event.

FIG. 4B is a flowchart showing exemplary steps performed in detecting a play in a sporting event. As shown in FIG. 4B, initially, at step 410, specific players in a sporting event are selected for inclusion in an aggregate motion tabulation. Combining the motion of multiple players minimizes the impact of the random movement of individual players and accentuates the differential movement associated with specific target situations. Certain players or players at certain positions inherently exhibit higher levels of differential motion than others. Selecting players with typically high levels of differential movement for the aggregate tabulation, and ignoring the remaining players, minimizes the effect of random motion while maximizing differential motion levels at various stages of a target situation.

In an American football game, certain 'skill' positions have a relatively high level of differential motion associated with the beginning or end of a play, thus their inclusion in an aggregate motion tabulation increases the differential levels of aggregate motion. Skill positions include wide receivers, running backs, and defensive backs. Linemen typically have low differential motion during play start/stop and so their inclusion in the tabulation reduces the differential levels of aggregate motion.

At step 412, a pre-play target set of conditions is identified. Situations of interest are generally preceded by a definable (sport-specific) set of conditions, players, positions, relative movements, and the like. The occurrence of this target set of conditions is an indication that a target situation will occur in the near future and is used as a pre-condition to a refined set of player position and alignment criteria.

The pre-play target conditions in American football are met when there are exactly 11 players from each team on the playing field and both teams are on their own side of the line of scrimmage. This situation occurs toward the end of segment A in the graph shown in FIG. 3.

At step 414, a system 'arm' condition is identified. In addition to pre-play conditions, a target situation is often immediately preceded by a definable (sport-specific) set of conditions, players, positions, relative movements, and the like. A system arm condition is an indication that the target situation is imminent and is used as a pre-condition to more specific, motion based criteria, described below.

In American football one arm condition is known as a 'line set'. This condition is defined by a certain number of linemen being stationary for a defined period (typically <800 ms) and the offensive and defensive linemen being positioned within a defined distance of each other (typically <2 meters). This situation occurs toward the end of segment B in the graph shown in FIG. 3.

At step 416, a start-of-play condition is identified. The beginning of a target situation (e.g., start of play) is characterized by a specific aggregate motion profile. In most cases this will be a rapid increase in aggregate motion but depending on the sport other aggregate motion profiles may exist. If the real time aggregate motion profile matches the aggregate motion start profile then the start of a situation has been detected.

In American football, immediately prior to the snap of the ball, all offensive players (with minor exceptions) are required to be motionless. This condition results in a very low aggregate motion baseline, which was established during the arm condition. As soon as the ball is snapped, all players begin moving nearly simultaneously, with the position players often moving rapidly. This results in the aggregate motion radically increasing over a very short period of time. This situation matches the profile for start-of-play and occurs toward the end of segment D in the graph shown in FIG. 3.

At step 418, an aggregate motion baseline of play is established. Following a start event the target situation will typically reach and maintain some level of sustained aggregate motion. This establishes an aggregate motion baseline value for the play.

Following the start of a play in American football, the players are typically moving at a reasonably stable level of aggregate motion. The magnitude of this level will vary depending on the type of play. In the case of a long pass play, the level of aggregate motion will be relatively high, and on a running play it will be relatively low. Regardless of the type of play, a sustained aggregate motion of some level will generally be established. This condition exists as segment E in the graph shown in FIG. 3.

At step 420, an end-of-play condition is identified. The end of this target situation (i.e., end-of-play) is characterized by a specific aggregate motion profile. In most cases this profile exhibits a gradual, yet constant, decrease in aggregate motion, with an initially faster decrease (e.g., a decrease in aggregate speed of 40% in 0.5 seconds) in the motion. If a particular real time aggregate motion profile matches the aggregate motion stop profile then the end of a play has been detected.

In American football, when the referee blows his whistle, indicating that a play has ended, the players will begin to slow down. While the aggregate motion will immediately begin to decline, since the players do not all stop instantaneously, or at the same instant, the decline will be more gradual than the play start. However, the end-of-play profile is identified by aggregate motion consistently decreasing over a predefined relatively short period of time, for example, 800 milliseconds. In practice, this duration is dictated by the specific sport and the specific situation of interest in that sport. This condition exists as segment F in the graph shown in FIG. 3.

Once a target situation has ended, system 100 begins looking for the next target situation to enter its pre-play condition. In an American football game, once a play is over the system monitors the players, positions, etc., as described above, seeking to identify the next pre-play condition. This condition exists in segment G and carries through into segment H in the graph shown in FIG. 3. If a game is still in progress at this point, the procedure described above resumes at step 412.

As noted above, the present system can determine the occurrence of a target situation at least partially from positional information. Examples of target situations determined from analysis of positional information include players breaking (from) a huddle, reaching a set position in a line formation, and the beginning of a play. For example, in an American football game, players' positions relative to each other, or relative to a particular yard marker may indicate that the players are lined up at the line of scrimmage immediately prior to beginning a play.

Figure 5A:
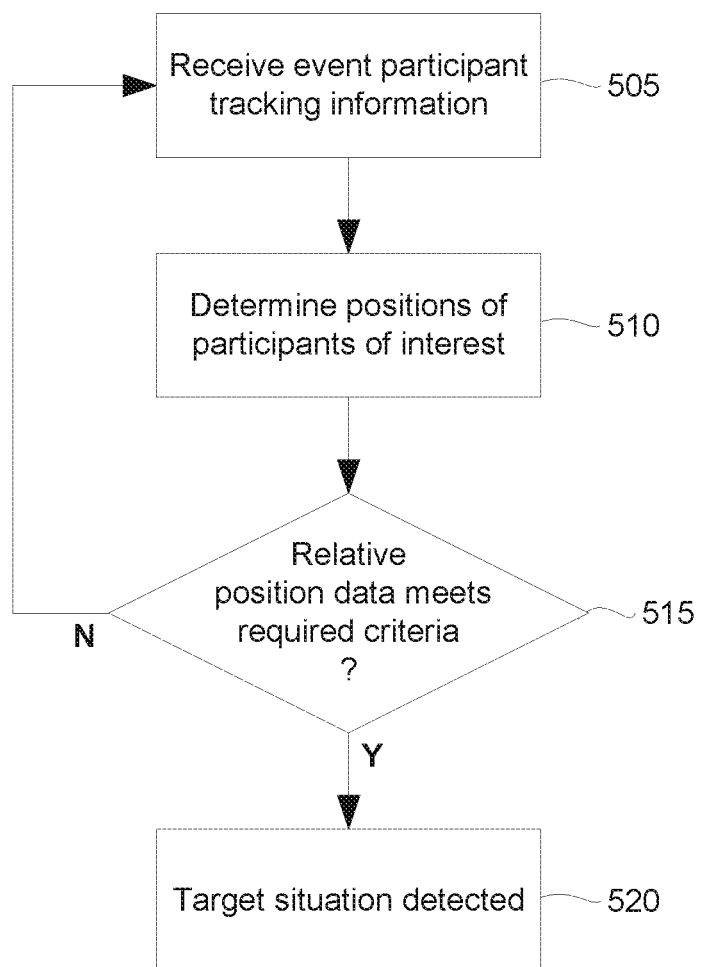
FIG. 5A is a flowchart showing exemplary steps performed in using positional information to determine certain target situations.

FIG. 5A is a flowchart showing exemplary steps performed in using positional information to determine target situations in real-time. As shown in FIG. 5, at step 505, tracking information, which includes the relative positions of event participants of interest, is received from tracking system 108. At step 510, the relative positions of selected participants (e.g., players on a particular team) are determined from analysis of the tracking information. At step 515, if the positions of the selected participants meet certain predefined criteria, then a corresponding target situation is detected, at step 520.

In one embodiment, the predefined criteria includes relative positions of participants determined by analyzing the tracking information to detect the participants' positions relative to certain position indicators, such as yard line markers in a football game. The criteria may also include the orientation of participants. e.g., the direction in which the participants are facing.

Examples of target situations that can be determined from positional information include team in huddle, players in a particular formation, and players' position relative to the line of scrimmage. Relative positions of coaches and officials can enable detection of a target situation such as a coach signaling a 'time out' or an official signaling a penalty. Positional information may also be used to analyze actions of officials and assist with their training.

In American football, there are a finite number of basic offensive and defensive formations in common use. On top of these there are many standard variations of these formations. Some of these variations are common to nearly all teams, while others are specific to individual teams. Beyond these standard and variant formations there are an infinite number of subtle formation variations, both intentional and unintentional.

Currently, defensive coaching staffs routinely study an upcoming opposition's offensive formations and subsequent play selection/execution. In conjunction with various game situations (e.g., 3rd down and long) they calculate the percentage of time an opponent runs certain plays in specific situations. For example, in a 'third and long' situation, when in a particular formation, the offense passes the ball 75 percent of the time and when passing from this formation the ball is passed it to a wide receiver 43 percent of the time.

The objective of compiling these statistics is to improve the accuracy with which the defense can predict which play the opposing offense will run in a given situation and, in turn, select the defensive formation with the highest likelihood of success. The identification of subtle variations in player formations allows the systematic prediction of which play the offense is most likely to run. An offense may intentionally employ a subtle formation variation as they believe there is advantage to be gained from this variation based on the play that is about to be run. For instance their pass blocking may be more effective when employing a very subtle increase in lineman spacing.

In analyzing video data from a team's past performances this variation can be systematically identified. This analysis may lead to learning that, in a third and long situation, when in a particular formation, and where the offensive line assumes a slightly wider space than normal, a particular offense passes the ball a certain percentage (e.g., 95.8 percent) of the time.

The present system compares formations, on a play by play basis, against a catalog of historical plays of the same class and systematically identifies subtle formation variations within each specific play. In the methods shown in FIGS. 5B-5H (described below), a computer program 116 is used to systematically determine statistically significant correlations between subtle formation variations and plays run when these specific subtle variations were present. Each of the examples in FIGS. 5B-5H is set forth in the context of American football; nevertheless, the methods described in accordance with these figures are applicable to other sports as well. This process systematically distills an infinite possible number of subtle variations down to a finite number of meaningful predictors, which increases play prediction accuracy, improves the ability to choose the most appropriate formation and thus may systematically improve a team's success percentage.

Figure 5B:
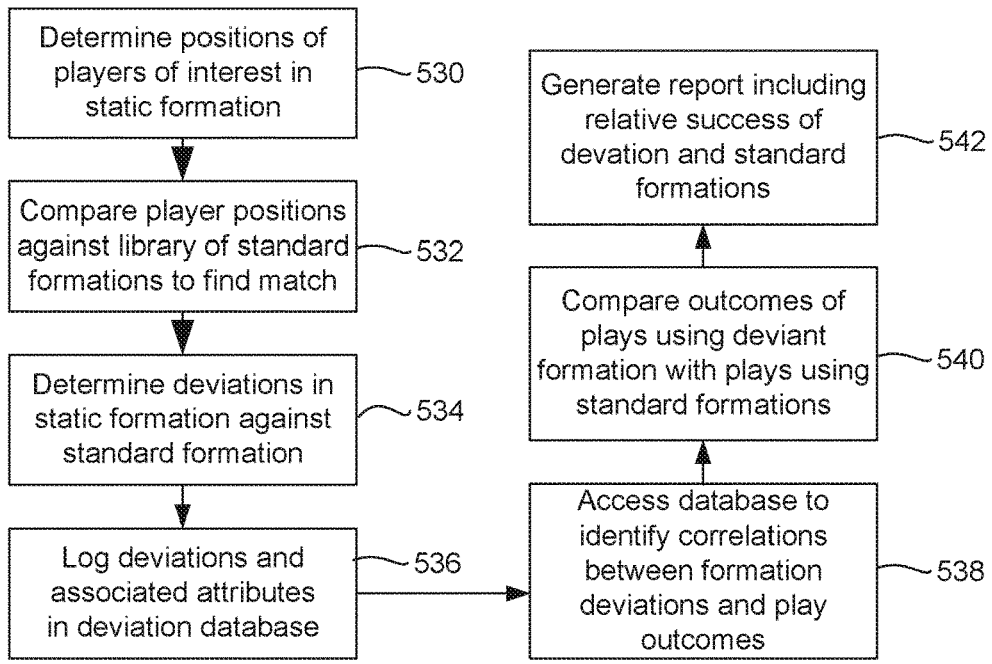
FIG. 5B is a flowchart showing exemplary steps performed in generating solutions and recommendations to increase a team's future success percentage.
Figure 5C:
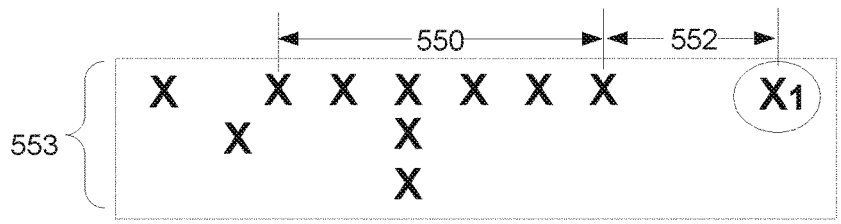
FIG. 5C is an exemplary diagram showing a standard line formation and a deviant of the standard formation.
Figure 5C:
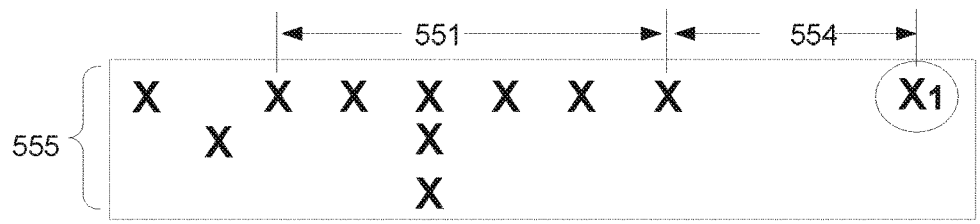

FIG. 5B is a flowchart showing exemplary steps performed in generating solutions and recommendations to increase a team's future success percentage based on detecting deviations in static formations, correlating these deviations to specific outcomes (play results) and comparing these correlations to the outcomes of previous situations. FIG. 5C is an exemplary diagram showing a standard line formation 553 and a deviant 555 of the standard formation, wherein "X"s indicate the players on one team. Operation of the present system is best understood by viewing FIGS. 5B and 5C in conjunction with one another.

Using player location data for a group of players (such as an offensive football squad in the present example), at a particular point in a game (i.e. just before a situation of interest, such as the snap of the ball), the relative positions of the players is established, at step 530, in FIG. 5B. Player location data can be acquired from tracking system 108 via link 107. The relative positions of these players define a static formation 553 for that group of players, which formation is associated with the subsequent play.

The static formation 555 established in step 530 is compared against a library (in database 115) of well known classes of standard formations and accepted variants of those standard formations to identify a best case match with a standard formation, at step 532. In the example shown in FIG. 5C, the standard formation thus identified is shown in box 553. In this particular standard formation 553, the line spacing (distance between the players at the left and right tackle positions, as indicated by marker 550) is 7 yards, and wide receiver X1 (circled) is lined up 5 yards away from the right tackle, as indicated by marker 552.

Once a best case match has been made, deviations between the determined static formation 555 and the standard library version of that formation 553 are identified, at step 534. These deviations can be as subtle as, for example, where the average line spacing is slightly wider (8 yards, as indicated by marker 551) than in the standard library formation (7 yards in the present example). These deviations may be significantly larger, as where a wide receiver lines up 10 yards away from the respective tackle (as indicated by marker 554), as opposed to 5 yards (as indicated by marker 552), per the standard library formation shown in FIG. 5C.

Having identified a deviation between the previously captured static formation 555 and the standard library formation 553, at step 536 this deviation is logged to database 115 along with a number of associated attributes such as deviation type (e.g., wide offensive line spacing), matched library formation (class & variant), play results (success or failure), and opposing formation (which type of defense was set up against the deviant offense in the static formation). Although yardage gained or lost is one measure of success, there may be other, more appropriate, measures of success depending on the circumstances. For example, if an offense is facing third down and 10 (yards to a first down) and they gain 9.8 yards, then with respect to gain vs. loss, the play might be judged, in the abstract, to be a success, but in this particular situation it was actually a failure. The above example is specific to football and the parameters of success/failure will vary with specific situations.

The above examples represent only two deviations which might be identified. In practice there may be 'intentional' deviations and many subtle, 'unintentional' deviations from the standard formation. Although the majority of these deviations may be tentatively deemed irrelevant to the play outcome, all deviations are nevertheless logged into database 115, as they may become relevant in the future as additional data is collected.

Once a best case match has been made, deviations between the static formation 555 and the standard library version 553 of that play are systematically evaluated. At step 538, system 100 accesses play deviation information in database 115 to identify deviations for which there are multiple instances and correlates these to play outcomes (both positive and negative).

Having identified these correlations, at step 540 these play outcomes are then compared to play outcomes when a particular deviation was not present, i.e., the deviant formation outcomes are compared against play outcomes resulting from corresponding 'standard' formations. Previous formations, with associated deviations, are repetitively compared against standard formations to get a best-case match for each, which information is then logged in database 115 along with attributes indicating, such things as the success/failure of the formation (e.g., the number of yards gained/lost using a particular deviant offensive formation against a specific defensive formation).

At step 542, the system uses the correlations thus established to generate a report for the coaching staff proposing solutions and/or recommendations such as those indicated in the example below:

Positive Outcome Variation Detected
    Squad: Offense
    Formation Class: passing
    Formation Variant: split wide receiver
    Deviation Type: increased line spacing
    Standard Success: 52.6%
    Deviation Success: 63.1%
    Recommendation(s):
    Increase line spacing in split receiver formations.

Investigate line spacing increases in passing class formations.

Figure 5D:
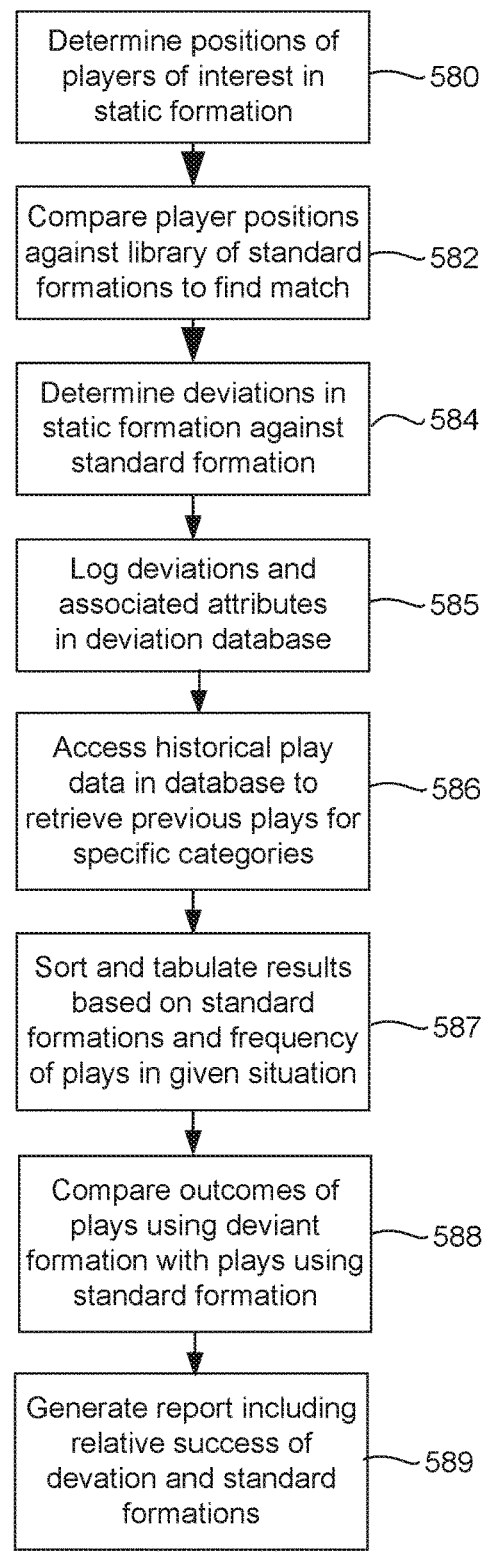
FIG. 5D is a flowchart showing exemplary steps performed in predicting an opponent's behavior based on detecting static formation deviations which are correlated with historical behavior.

FIG. 5D is a flowchart showing exemplary steps performed in predicting an opponent's behavior based on detecting deviations in static formations and correlating these deviations to historical behavior in given situations. Operation of the present system is best understood by viewing FIGS. 5D and 5C (described above) in conjunction with one another.

Using player location data for an offensive football squad, in the present example, at a particular point in a game (i.e. just before a situation of interest, such as the snap of the ball), the relative positions of those players is established, at step 580, in FIG. 5D. The relative positions of these players define a static formation 555 (shown in FIG. 5C) for that group of players, which formation is associated with the subsequent play.

The static formation 555 established in step 580 is compared against a library (in database 115) of classes of standard formations for the specified team of interest and accepted variants of those standard formations, for a specific team of interest, to identify a best case match with a standard formation used by that team, at step 582. In the example shown in FIG. 5E, the standard formation thus identified is shown in box 553. In this particular standard formation 553 (which is the same formation as indicated in the example of FIG. 5B), the line spacing is 7 yards, and wide receiver X1 is lined up 5 yards away from the right tackle.

Once a best case match has been made, potentially significant deviations between the defined static formation 555 and the standard library version 553 of that formation are identified, at step 584. Having identified a deviation between the static formation 555 and the standard library formation 553 for the team of interest, at step 585 this particular deviation is logged to database 115 along with a number of associated attributes such as deviation type (e.g., wide offensive line spacing), matched library formation (class & variant), situation (e.g., which down and the number of yards to go), and subsequent type of play run. This type of information may be used by a defensive squad to analyze an offensive squad for specific 'down and distance' situations to determine, on a statistical basis, what type of play this offensive squad runs when faced with a particular situation, for example, third down and between 7 and 10 yards to a first down.

At step 586, system 100 accesses historical play data in database 115 to selectively retrieve previous plays for specific situational categories, for example, first down and ten yards to go, from between the opponent's 10 and 20 yard lines, for a team of interest. At step 587, the results are then sorted into groups based on standard formations for the team of interest and a tabulation is made of the percentage of times specific plays were run from this standard formation given a specific type of game situation. The results are then further sorted based on common, identifiable, and sometimes subtle, deviations from the standard formation 553. After identifying correlations between formation deviations and their outcomes, at step 588 these outcomes are then compared to play outcomes when a particular deviation was not present, i.e., the deviant formation outcomes are compared against play outcomes resulting from corresponding 'standard' formations.

At step 589, a report is generated in which these tabulations are cataloged based on situations of interest for the coaching staff. The report is used in preparing a team to more accurately predict what the team of interest will do in a given situation, from a specific formation and how specific deviations in that formation refine the likelihood of a particular behavior. A typical report may include information such as that indicated in the example below:

Behavior Prediction Based on Situation, Formation and Variant
    Squad: offense
    Down: third
    Yardage: 7<x<10
    Formation Class: passing
    Pass 80%
    Run 20%
    Formation variant: split wide receiver
    Deviation type: increased line spacing
    Pass: 85%
    Run: 15%
    Formation Variant: split wide receiver
    Deviation Type: increased wide receiver spacing
    Pass: 93%
    Run: 7%

Play recognition is a type of target situation that may be detected by the use of information such as the path of travel of an event participant, as determined from positional, velocity, and path information. This information can be compared to a database of known plays to recognize a particular type of play. In the embodiments described below with respect to FIGS. 5E-5H, database 115 is populated with information indicating previous formations and plays run by a particular team in given game situations.

Figure 5E:
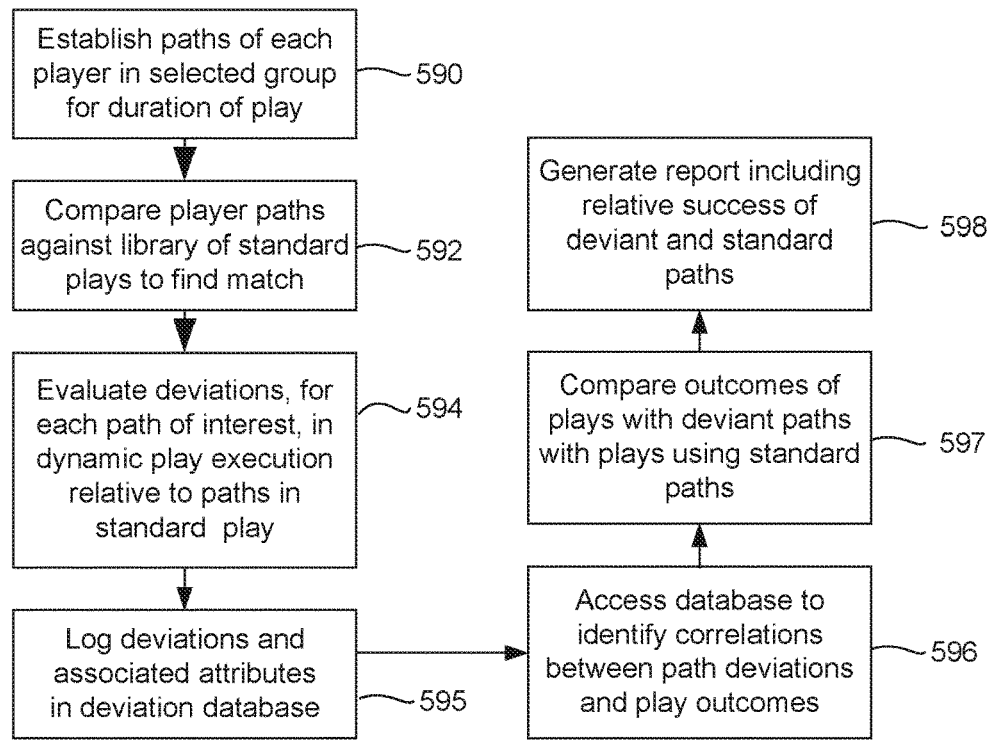
FIG. 5E is a flowchart showing exemplary steps performed in generating solutions and recommendations to improve the performance of a team based on detecting deviations in dynamic play execution
Figure 5F:
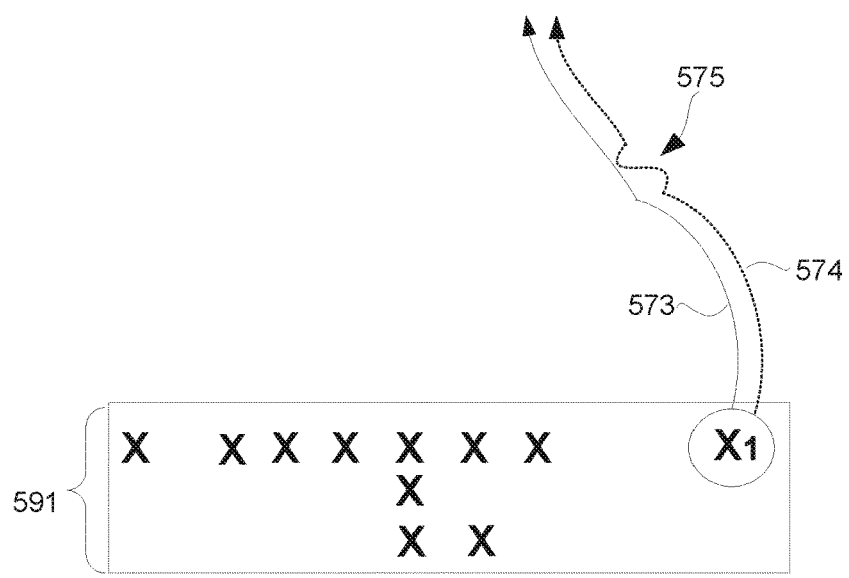
FIG. 5F is an exemplary diagram showing a standard route and a deviant route in two similar patterns (paths) run by a wide receiver.

FIG. 5E is a flowchart showing exemplary steps performed in generating solutions and recommendations to improve the performance of a team based on detecting deviations in dynamic play execution, correlating these deviations to specific outcomes and comparing the correlations to the outcomes of previous situations. FIG. 5F is an exemplary diagram showing a standard route 573 and a deviant route 574 in similar patterns (paths) run by a wide receiver. Operation of the present system is best understood by viewing FIGS. 5E and 5F in conjunction with one another.

Using a player location data set for a selected group of participants (such as an offensive football squad) captured for the full duration of a situation of interest (e.g., an entire play), the path of each individual participant is determined, at step 590. The collection of these individual paths defines a dynamic play execution. In step 592, the dynamic play execution established in step 590 is compared against a library of well known classes of standard play executions (and accepted variants of those standard executions) stored in database 115, to establish a best case match with a standard type of play.

This comparison is considered from the perspective of individual paths, which are compared to predefined paths and the paths treated as a collection of individual data points. Although there may be multiple paths, each player has a predefined path, so the paths can be processed individually. While the paths are actually two dimensional, they are treated simply as collections of discrete data points, which can be evaluated for deviation from a standard path. What might be considered a significant deviation will vary by sport, situation of interest, and by player position. When considering, for example, a wide receiver in an offensive football play, a deviation of more than 1.5 yards from predefined path may be considered significant.

In finding matches between deviations so that they can be grouped together, each standard play execution is considered as a collection of individual, predefined paths. Each individual path comprises a collection of specific segments consisting of legs and inflection points. As an example, a wide receiver route might be described as follows:

Wide Receiver Path Segments
  Start of play
  Segment 1—straight for 5 yards
  Segment 2-90 degree turn toward center of field
  Segment 3-10 yards straight
  Segment 4-45 degree turn in opposite direction of segment 2 turn
  Segment 5—straight until end of play Once a path within a dynamic play execution has been identified, then the segment in which the deviation occurred is identified. Deviations in individual paths are selected for further evaluation and, once selected, these paths are further classified such that they can be grouped with, and compared to, previously recorded deviations.

Once a best case match has been made between the dynamic play execution established in step 590 and a standard type of play, deviations between each path of interest within the dynamic play execution set and the paths defined in the standard library version of that play execution are evaluated, at step 594. In FIG. 5F, two paths for offensive player X1 (e.g., a wide receiver) in formation 591 are shown—path 574 is the path selected from the dynamic play execution established in step 590, and path 573 is the path with the best case match selected from the standard library of plays. The deviations determined by the evaluation made in step 594 may be as subtle as a wide receiver making a jog (at arrow 575) in his pattern where the receiver changes his 'cut point', as shown in FIG. 5F.

The present example represents one possible path deviation which might be identified. In practice there may be a large number of deviations present in a single play and possibly even multiple deviations in a single player's path. Having identified a deviation between a path within a dynamic play execution and the standard library path for that play execution, at step 595 this deviation is logged to database 115 along with a number of associated attributes such as deviation type (e.g., wide receiver path), deviation specifics (e.g., additional course changes), matched library formation (class & variant), play outcome (success or failure), and opposing formation (which type of defense). Although the majority of the deviations may be tentatively deemed irrelevant to the play outcome, all deviations are nevertheless logged in database 115 as they may become relevant in the future as additional data is collected.

At step 596, deviation information in database 115 is accessed to identify significant correlations between various path deviations and play outcomes (both positive and negative). Having identified these correlations, at step 597 the outcomes are then compared to corresponding standard play outcomes, that is, the results of a standard play that had been executed as intended (e.g., as the play was initially drawn on a chalkboard) when a particular deviation was not present. At step 598, these correlations are then used to generate a report for the coaching staff including relative success of deviant and standard paths, and optionally proposing solutions and recommendations. A typical report may include information such as the following:

Positive Outcome Variation Detected—Dynamic Play Execution
  Squad: Offense
  Execution Class: Passing
  Execution Variant: Split wide receiver
  Deviation Type: Receiver Path
  Deviation Specific: Additional course changes
  Standard Success: 52.6%
  Deviation Success: 61.6%
  Recommendation(s):
    Incorporate additional course changes in wide receiver path.
    Investigate additional course changes in all receiver routes.

Figure 5G:
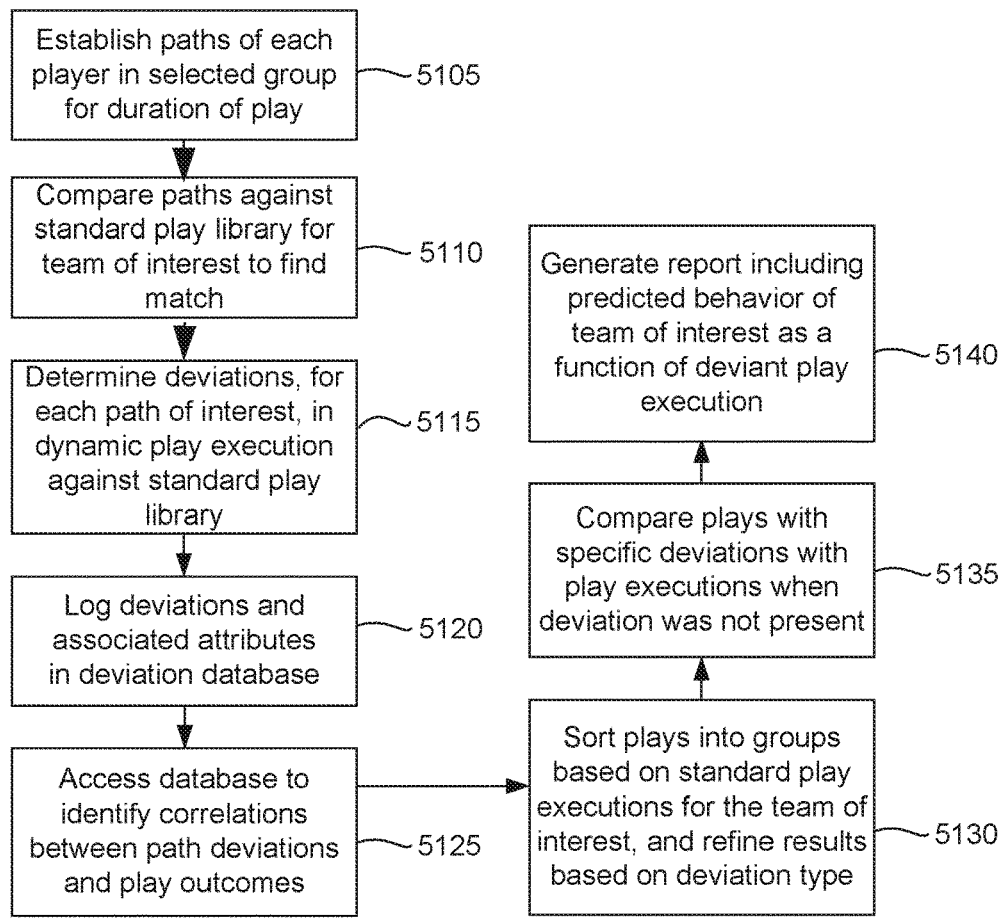
FIG. 5G is a flowchart showing exemplary steps performed in predicting an opponent's behavior based on detecting deviations in dynamic play execution and correlating these deviations to previous behavior in specific situations.
Figure 5H:
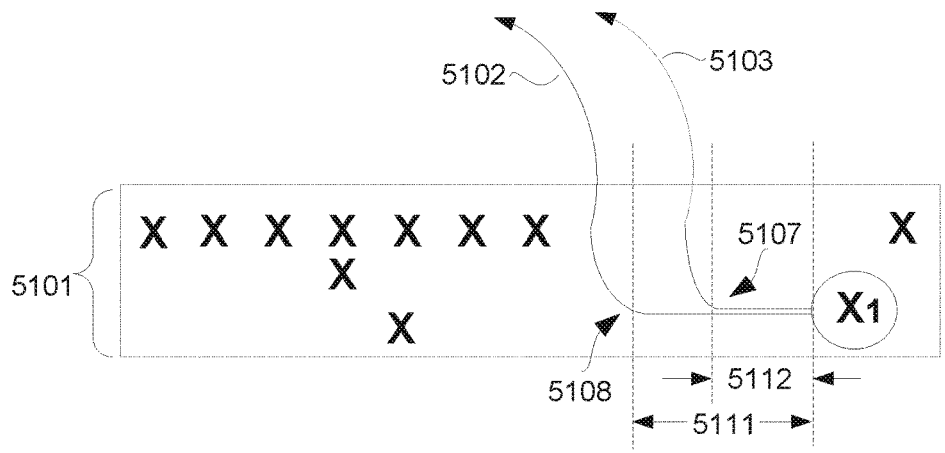
FIG. 5H is an exemplary diagram showing a standard route and a deviant route in two similar patterns (paths) run by a slot receiver.

FIG. 5G is a flowchart showing exemplary steps performed in predicting an opponent's behavior based on detecting deviations in dynamic play execution and correlating these deviations to previous behavior in specific situations. FIG. 5H is an exemplary diagram showing a standard route and a deviant route in similar patterns (paths) run by a slot receiver. Operation of the present system is best understood by viewing FIGS. 5G and 5H in conjunction with one another.

Using a player location data set for a selected group of participants (such as an offensive football squad) of a team of interest, captured for the full duration of a particular situation (e.g., an entire play), the path of each individual participant is determined, at step S105. The collection of these individual paths defines a dynamic play execution.

In step S110, the dynamic play execution established in step S105 is compared against a library (stored in database 115) of well known classes of standard play executions and accepted variants of those standard executions, for a specific team of interest, to establish a best case match for a selected standard type of play. Once a best case match has been made, deviations between each path of interest within the dynamic play execution set and the paths defined in the standard library version of that play execution are evaluated, at step S115.

In FIG. 5H, two paths for offensive player X1 (e.g., a slot receiver) in formation 5101 are shown—path 5103 is the path selected from the dynamic play execution established in step S105, and path 5102 is the path with the best case match selected from the standard library of plays. Note that 'standard' path 5102 and deviant path 5103 have respective 'cut point' distances 5111 and 5112. The deviations determined by the evaluation made in step S115 may be as subtle as a slot receiver cutting his 'in motion' path short (at arrow 5107) relative to where he would normally change direction at the standard cut point (at arrow 5108), as shown in FIG. 5H.

Having identified a deviation between a path within a dynamic play execution and the standard library path for that play execution and team of interest, at step S120 this deviation is logged to database 115 along with a number of associated attributes such as deviation type (e.g., slot receiver path), deviation specifics (e.g., motion duration), matched library formation (class & variant), situation (e.g., down number and yards to first down), and subsequent type of play run.

At step S125, information in database 115 indicating previous performances for the team of interest is accessed to retrieve selected plays for specific situational categories. At step S130, the plays are then sorted into groups based on standard play executions for the team of interest, and the corresponding frequency with which specific behaviors (e.g., which player ran the ball) occurred are tabulated. The sorted results are refined based on common, identifiable, and often subtle, deviations from the standard play execution. The percentages of times specific behaviors occurred (e.g., who the ball was thrown to in a specific situation) are tabulated for instances when a play execution deviation was present.

At step S135, the system accesses information in database 115 to identify deviations for which there are multiple instances and compares the behavior (the specific type of play executed) in specific play executions when a particular deviation is present, to behavior when the deviation is not present.

A defensive squad may want to analyze an offensive squad for specific 'down and distance' situations on a statistical basis to determine what an offensive squad typically does when faced with a third down and between 7 and 10 yards to first down. Dynamic play deviation information can be used to refine a team's prediction ability and improve their success percentage.

A report is thus generated, at step S140, to catalog the predicted behavior of a team of interest as a function of deviant play execution and situations of interest, as determined above. A coaching staff may use this report in preparing their team to more accurately predict what the team of interest will do in a given situation during a specific play execution, and how specific deviations in that execution indicate the likelihood of a particular behavior (e.g., who the ball is thrown to). A typical report may include the following information:

Behavior Prediction Based on Situation, Dynamic Play Execution and Deviation
    Squad: offense
    Down: third
    Yardage: 7<x<10
    Formation class: passing
    Pass to slot 25%
    Pass to other 55%
    Run 20%
    Formation Variant: slot receiver motion
    Deviation Type: shortened motion duration
    Pass to slot: 80%
    Pass to other: 15%
    Run: 5%

In one embodiment, player movements can be traced in real time onto live feed 109, statically positioned on the field surface as the camera moves, from detected start of play until detected end of play. In another embodiment, player paths are automatically shown in real time on a graphic screen. Data collected (e.g., via link 107, or from database 115) by system 100 is associated with the corresponding video footage; therefore, if a video is selected for replay, the associated data may be used to generate graphic and statistics for combining with, or overlaying onto, video feed 109.

A generated graphic of the field and players can be a perspective view which allows fading between live action footage and graphic views. If the graphics are generated to have the same aspect ratio and viewing angle as the camera view, player traces and marked paths remain constant when fading from generated graphic to camera view. This avoids the switching from a side perspective view of a camera to a generated plan view to show a play. Once transitioned to the generated perspective graphic view, the graphic can be rotated to provide the most appropriate viewing angle for showing the play.

Figure 6A:
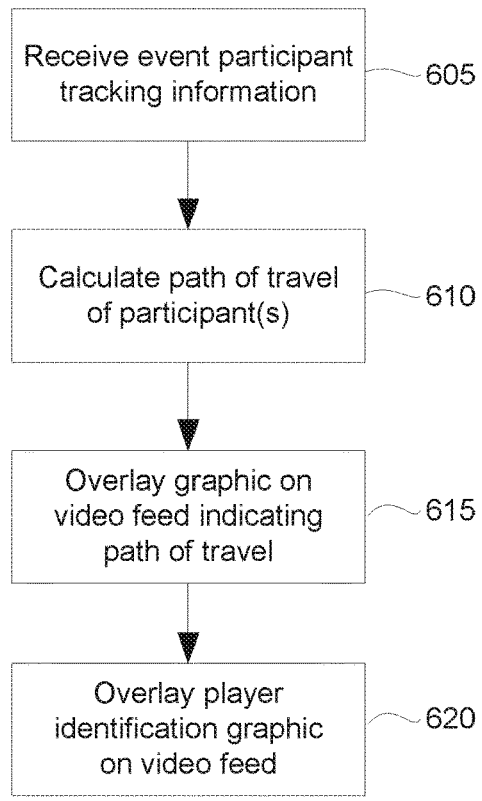
FIG. 6A is a flowchart showing exemplary steps performed in using positional information to provide automatic annotation of a video feed of an event.
Figure 6B:
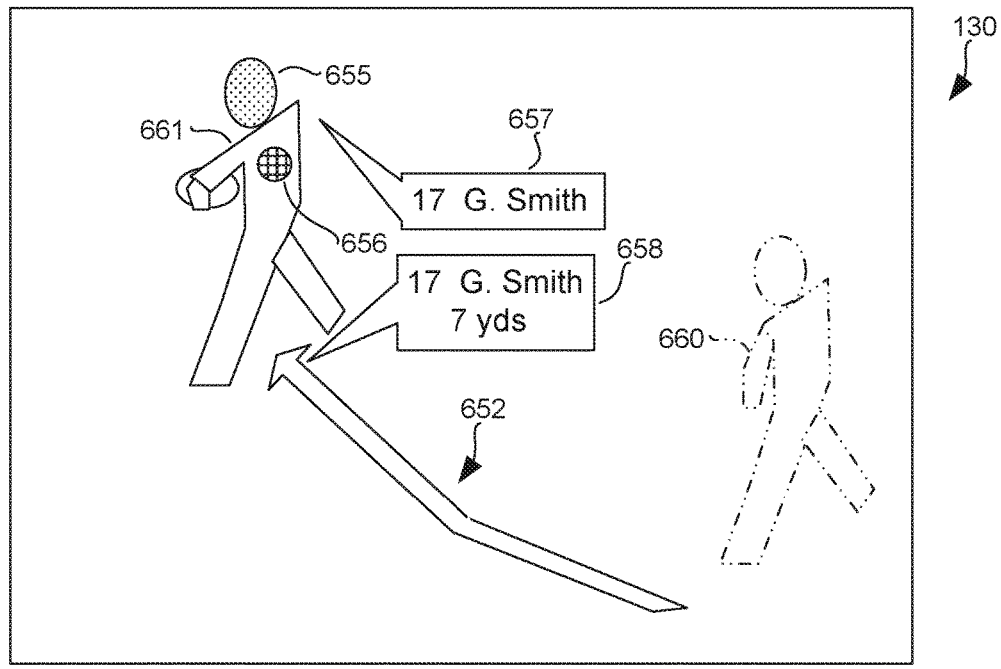
FIG. 6B is an exemplary diagram showing player identification graphics indicating a video display.

FIG. 6A is a flowchart showing exemplary steps performed in using positional information to provide real-time automatic annotation of a video feed 120 of an event. FIG. 6B is an exemplary diagram showing player identification graphics and the traced path of a player on a video display 130. A graphic showing the path of travel of one or more selected players 660, 661 can be displayed either in real time, or after the end of a play. As shown in FIG. 6A, at step 605, tracking information from tracking system 108 is received for event participants of interest. At step 610, the path of travel of one or more of the participants is calculated, using positional information calculated from tracking system 108 data. At step 615, a graphic 652, indicating the path of travel of the selected participant(s), for example, the path for player 661, is overlaid onto the video feed 120, as indicated in FIG. 6B.

System 100 can also show, via output 104, the identity and locations of multiple players on the field, and their associated teams (e.g., players of team A in red, players of team B in blue). This information can be displayed on a graphic representing the actual playing field, or overlaid on the live video feed 109, as indicated in step 620.

In one embodiment, the present system keeps continuous track of selected off-screen objects so that the off-screen location of the objects is indicated, and the objects are highlighted immediately upon entering the field of view. A 'camera view' coordinate system is used, wherein the center of the screen is assigned the coordinate (0,0), the upper left has the coordinate (−1, −1), and the lower right is (1,1). Note that the X and Y scales are not the same, since video displays (including television screens) have an aspect ratio by which the screen width is greater than the screen height. Thus the point represented by the coordinate (0.5,0) is located further to the right of center-screen than the point represented by coordinate (0,0.5) is located down from the center. It should be noted that the coordinate system employed by the present system may be different than that described herein and still provide the same function.

Using the coordinate system described above, it is relatively simple to determine if an object is on screen, as both the X and Y coordinates will be $>=-1$ and $<=1$. When reporting the location of an object, its coordinates can be $<-1$ or $>1$, meaning it is off screen. At high zoom levels, object coordinates can be much larger than 1 or much smaller than −1.

Figure 6C:
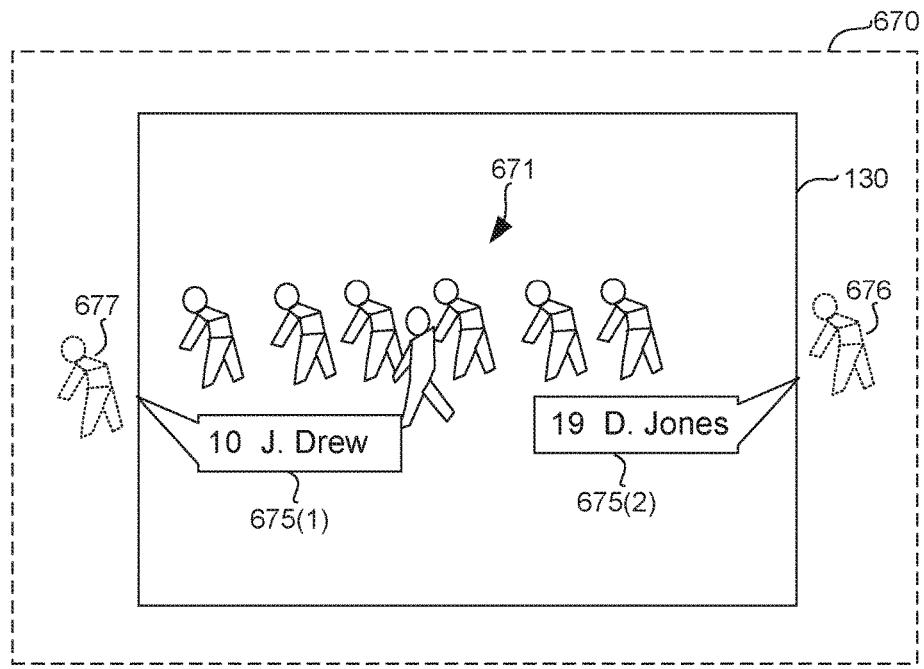
FIG. 6C is an exemplary diagram showing player identification graphics indicating the off-screen location of an object.

FIG. 6C is an exemplary diagram showing player identification graphics indicating the off-screen location of selected objects. By calculating the direction of an off-screen object relative to a border of a display screen 130, the present system can determine which location along the appropriate screen border is closest to the object. A highlighting indicator or marker 675 is placed at this location proximate the border of the screen 130 to indicate that the off-screen object (e.g., player 676 or 677) is in a particular direction relative to the images displayed on the screen. Dotted box 670 represents the potential field of view of a camera (e.g., video camera 117) which is providing the video feed 109 displayed on screen 130. When a previously off-screen object again becomes visible 'on-screen', the marker may change its appearance and continue tracking the object, as shown in FIG. 6B.

One example of off-screen tracking is a close-up of the quarterback and the linemen around him (indicated by arrow 671), where two wide receivers 676, 677 are not in view on screen 130, as shown in FIG. 6C. Each wide receiver's general location is indicated with a marker 675(1), 675(2) positioned next to the appropriate edge of the screen 130, thus allowing a viewer to tell which wide receiver the quarterback is looking toward at a given point in time. Marker 675 may include identifying text, or may simply be color-coded to represent one or more players of a specific type.

Player identities can be indicated via output 104 in real time, for example, via a player identification graphic 657 overlaid onto the video feed such that it is close to the player's head or body. Graphic 657 shows, for example, the player's number and name, but may, alternatively or additionally, provide other information such as the number of yards gained or lost on a particular play, as indicated by graphic 658. In other embodiments, all of, or certain parts of, selected players 655 may be highlighted, as indicated by an optionally blinking 'dot' 656, or other part of the player, such as the player's head or helmet 655. One or more players to be highlighted can be user-selected (via user input 118, such as a handheld device described below) or selected by the system. For example, the system may automatically identify a quarterback, or all eligible receivers may be automatically identified after a quarterback throws the ball.

In another embodiment, certain players can be highlighted as a result of detection of a target situation, such as when two players are within a predetermined distance of each other, e.g., when a receiver is within a predetermined distance of a defensive back.

System 100 can also draw the line of scrimmage and yard markers and overlay them onto video feed 109. In the case of American football, the approximate line of scrimmage can be determined from the players' (e.g., linemens') positions and the distance to a first down can be automatically calculated and added as an annotation. Participant parameters, such as distance traveled, velocity, and/or acceleration, can also be displayed on a graphic 658 via output 104.

The graphics generated by the present system may be partially transparent or opaque, depending on the particular graphic being displayed and whether the graphic is an overlay or not. Graphics may fade between an image of an event (e.g., live action footage) in the video feed and a particular graphic. Graphics may include images that represent actual players, as commonly done in video games.

Graphics may have same aspect ratio and viewing angle as image of an event, such that player path traces and marked paths remain constant when fading between the graphic and the image, thereby providing a smooth transition during the fading process. Alternately, a graphic may have a different aspect ratio and/or viewing angle than the corresponding image to present a view of the event that is different than the video image of the event.

Figure 6D:
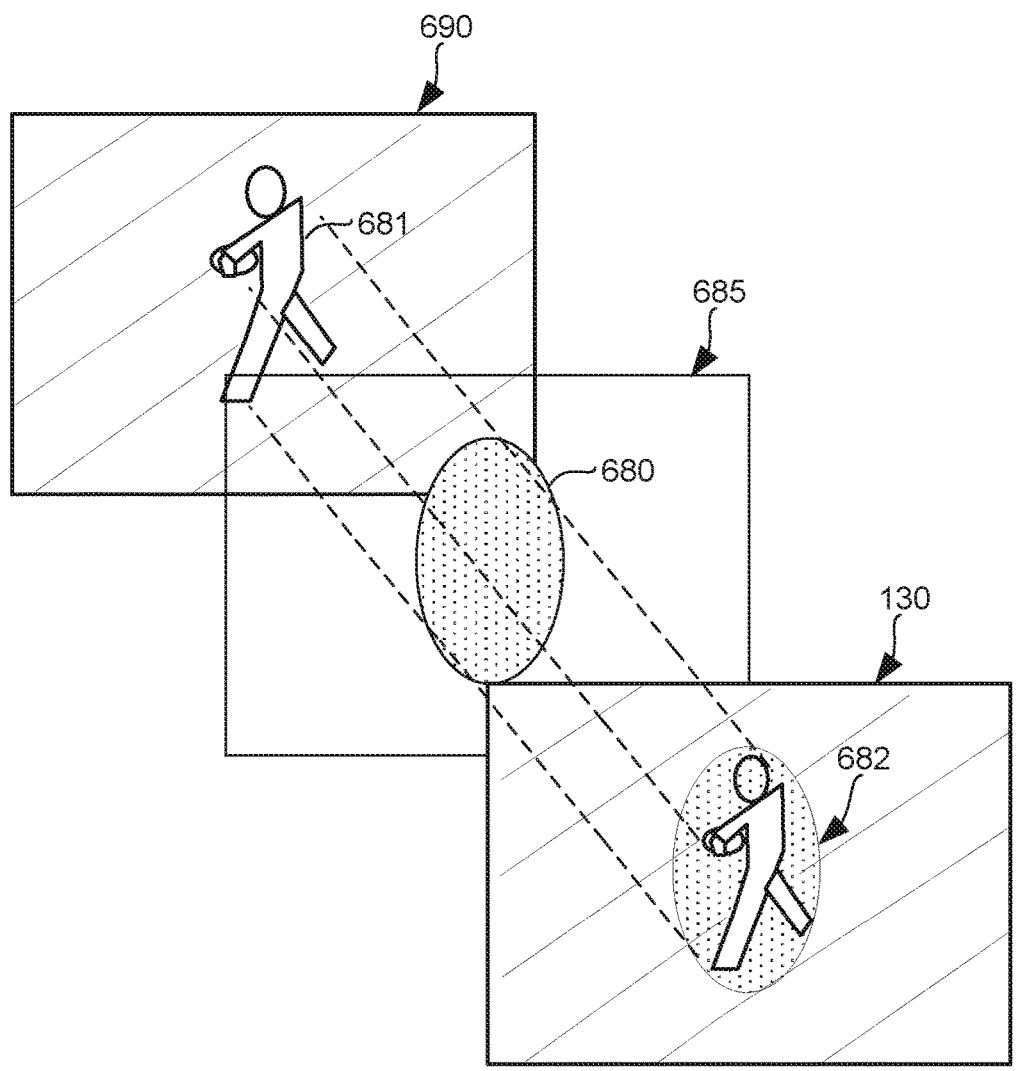
FIG. 6D is an exemplary diagram showing a window containing a highlighting shape overlaid on a video stream.

FIG. 6D is an exemplary diagram showing a window 685 containing a highlighting shape 680 overlaid onto a video feed 690. In one embodiment, rather than modifying the incoming video feed 109 frame-by-frame, the present system instead uses a standard video player to overlay, on top of a video stream 690 (e.g., video feed 109), a window 685 which includes a ratiometrically correct highlighted image of each player being highlighted. This overlay window 685 is transparent, except for semi-transparent areas filled with any color except black. To create a highlight, a white, semi-transparent oval (or a highlighting indicator of other desired color/shape) 680 approximately the size of the player to be highlighted (player 681 in FIG. 6D) is drawn on the overlay window 685 at the approximate position of the player. The position of the player is determined from location information extracted from tracking system 108. The highlighting indicator 680 is overlaid on the streamed video image 690 to create an image with highlight 682, while the rest of the video image remains unchanged. With this method, rather than having to deal with the higher bandwidth video data stream, the present system has a simpler and less time-constrained task of creating overlay updates independent of more frequent video frame updates, since the highlighting indicator 680 is re-drawn only when the position of the highlighted player changes, in the composite displayed image, by a predetermined displacement.

When a single player is being tracked by the camera, the system constantly modifies the zoom level in an effort to maintain the displayed player at a relatively constant size in the video frame regardless of how near or far away the player is from the camera. In the case where only one player is tracked, the sizing of the highlight is relatively constant except at the minimum and maximum zoom levels.

When other players that are not being tracked appear in the video feed, the highlight size becomes accordingly dynamic. The size of the player in the video frame, and therefore the required size of the highlight, is generally based on how much closer or further away from the camera these other players are in comparison to the tracked player. In either case (both camera-tracked, and non-camera-tracked players), the system continuously calculates a size-in-the-video-frame metric each time new location information arrives for a player. This metric is used to determine the size of the highlighting shape, and is based on information including the video camera location, the location of the player(s), the pan & tilt settings of the camera, and the current camera zoom level.

The translation of this information into a size-in-the-video-frame metric involves a series of calculations/transforms including determining a camera's field of view based on pan, tilt and zoom of a plane parallel to the lens, and correcting that field-of-view measurement based on the degree to which the field is not parallel to the lens (i.e., correcting for camera angle, relative to field). Once the field-of-view of the camera (e.g., camera 117) is calculated, then the position and size within that field of view is calculated for each of the location units (on players of interest) within the view. This calculation also corrects for the camera angle. Rather than use the raw noisy location data, both the field-of-view and the size-in-the-video-frame calculations are based on filtered location data. The filtering may be identical to that used in controlling the camera motion.

Figure 7:
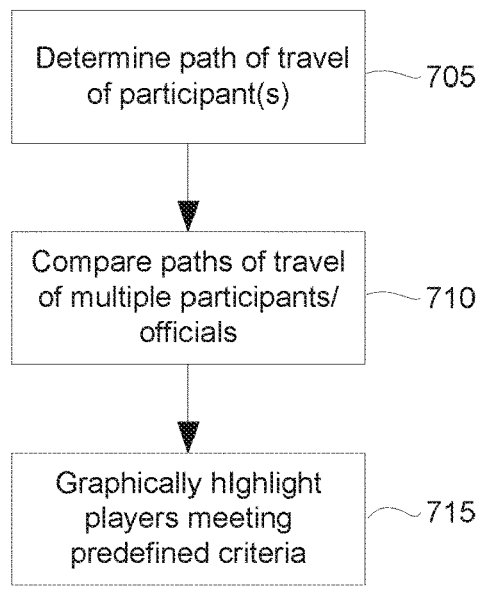
FIG. 7 is a flowchart showing exemplary steps performed in evaluating a participant's performance.

In one embodiment of the present system 100, the path of travel of a participant is automatically analyzed and displayed to evaluate the performance of a participant. FIG. 7 is a flowchart showing exemplary steps performed in evaluating a participant's performance. As shown in FIG. 7, at step 705, the path of travel of one or more selected participants is determined. The distance traveled by the participant, and/or the participant's velocity may also be determined. At step 710, paths of travel for multiple players are compared to determine how well a particular player was able to perform during a given play (e.g., in avoiding players from an opposing team, or in 'covering' another player). In the case of officials, their paths show where the officials traveled during a particular play. This information may be helpful in evaluating an official's effectiveness.

At step 715, one or more players whose path meets predetermined criteria is automatically highlighted on a graphic. For example, 'open' players (i.e., offensive players who are separated from all defensive players by a certain distance) or blocked players (i.e., those whose velocity during a certain time period is less than a minimum threshold and who are positioned in sufficiently close proximity to a player on the opposite team), by changing the color of these players as displayed on a graphic, which may also show the players' path of travel.

A graphic showing a path of travel may also show orientation of the participant(s), for example, the direction in which a quarterback or referee was facing. A graphic may automatically change configuration in response to a target situation, for example, a dashed line may be displayed during play and a solid line displayed at the end of play.

In one embodiment, system 100 may control the imaging of an event at least partially in response to event characterization information 104. The system may automatically direct a robotic camera 117 to capture or 'cover' a target situation such as the beginning of a play, or when certain players are positioned within a predetermined distance of each other. For example, a camera may be automatically directed to cover an area of interest such as the line of scrimmage, a huddle, or a particular participant or participants in response to, or in anticipation of, a target situation, e.g., camera 117 may be directed to cover a quarterback upon detection of the beginning of a play. This procedure may help ensure that play is not missed due to other action on the field.

In any game there are a number of situations which have the potential to evolve into a target situation. Some examples include:

- Two hockey players who have had confrontations in the past are likely to get into a fight at some point during a game. Every time they are near each other, they can be targeted in high zoom with a robotic camera 117 in anticipation of a target situation.
- Two football players have a historically notorious match-up. Every time they are near each other, they can be targeted in high zoom with a robotic camera 117 in anticipation of a target situation.
- A particular basketball player is a good three point shooter. Every time he is near the three point line, he can be targeted in high zoom with a robotic camera 117 in anticipation of a target situation.

In one embodiment, system 100 has access to the positions of all players on the field of play and a predefined, prioritized list of conditions to watch for. When system 100 identifies the conditions which precede a target situation, the system directs a robotic camera 117 to zoom in on and track the appropriate subject(s).

A simple example is a hockey game in which there are two players who fought in the last game. The odds that they will fight again are high and thus any time they are in close proximity, a situation of interest is determined to exist. Should a target situation subsequently occur, high zoom video footage becomes available before occurrence of the event defined by the target situation. In the case of a hockey fight there is often an extended period of close proximity during which glances, gestures and stares are exchanged in a period preceding the actual confrontation.

System 100 can cause video to be generated only during time intervals where the system has detected a play in process. Video buffers may capture leaders or trailers to ensure that an entire play is recorded. Alternatively, the entirety of an event, or a significant portion of it may be recorded, in which case the system may automatically post-edit the video recording to remove footage that does not include plays in progress.

Figure 8:
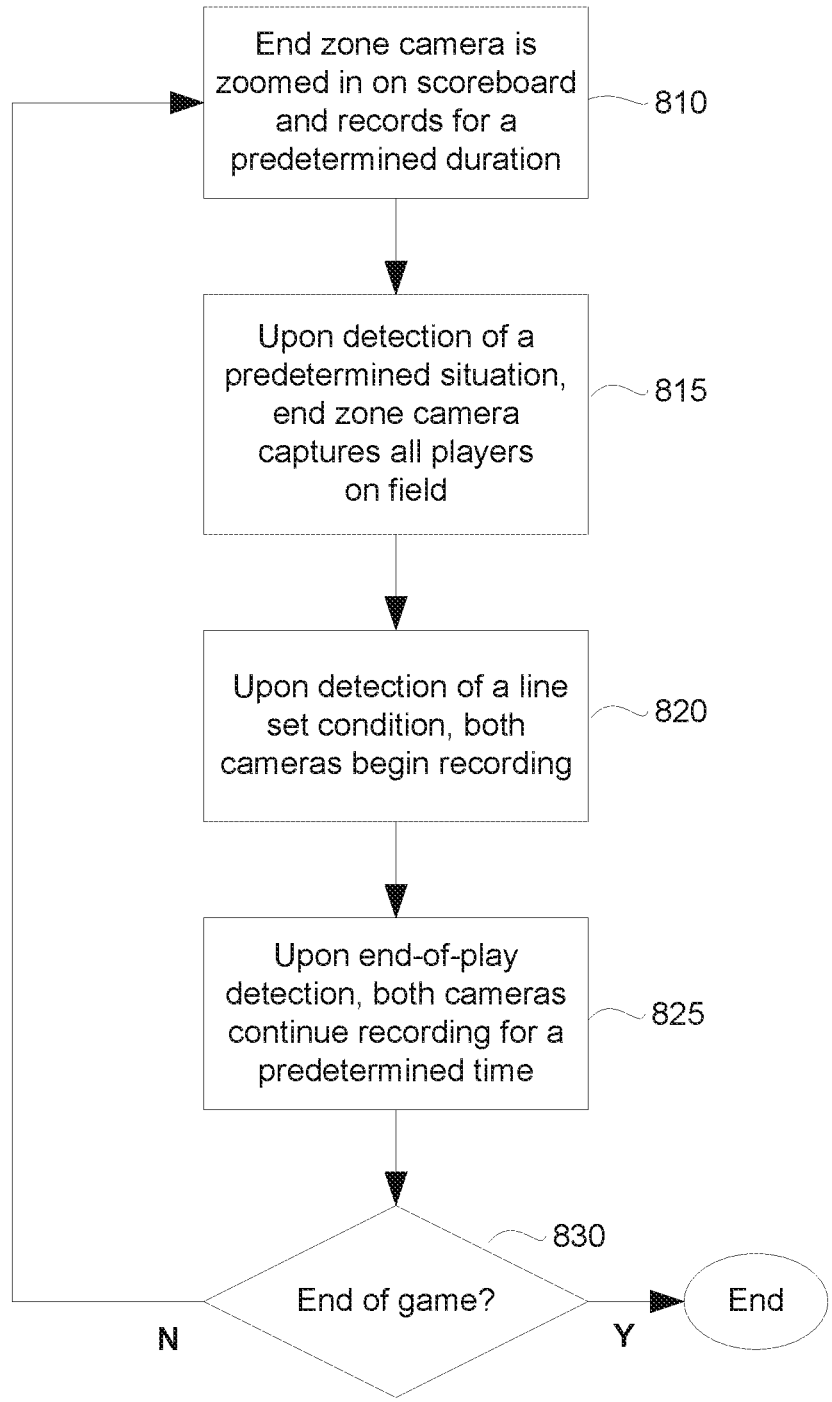
FIG. 8 is a flowchart showing exemplary steps performed in automating the video filming of selected parts of an entire game.

In one embodiment, an entire game video is completely automated. This automation emulates what is typically done with a manually operated camera. FIG. 8 is a flowchart showing exemplary steps performed in automating the video filming of predetermined types of segments of a game. The exemplary process shown in FIG. 8 may be performed for a game of American football with two cameras, for example, with one camera 117 at an end zone and another camera 117 in a press box.

In one embodiment, a camera 117 in the press box (or other vantage point) automatically captures all (22) players on the field during the entire game, at step 805. The press box camera may either record the entire field of play or, alternatively, zoom in to more closely capture a smaller area on the field in which all of the players are located. As indicated in FIG. 8, at step 810, a camera 117 in the end zone is zoomed in on a scoreboard and records for a predetermined duration (e.g., 10 seconds). At step 815, upon detection of a predetermined type of situation (e.g., players moving to a line of scrimmage), the end zone camera moves and/or zooms to capture all players on the field. At step 820, upon detection of a line set condition, both press box and end zone cameras begin recording. At step 825, upon end-of-play detection, both cameras continue recording for a predetermined time, e.g., 5 seconds, and then stop recording. If it is not yet the end of the game (step 830), then steps 810-825 are repeated until the game ends.

Figure 9:
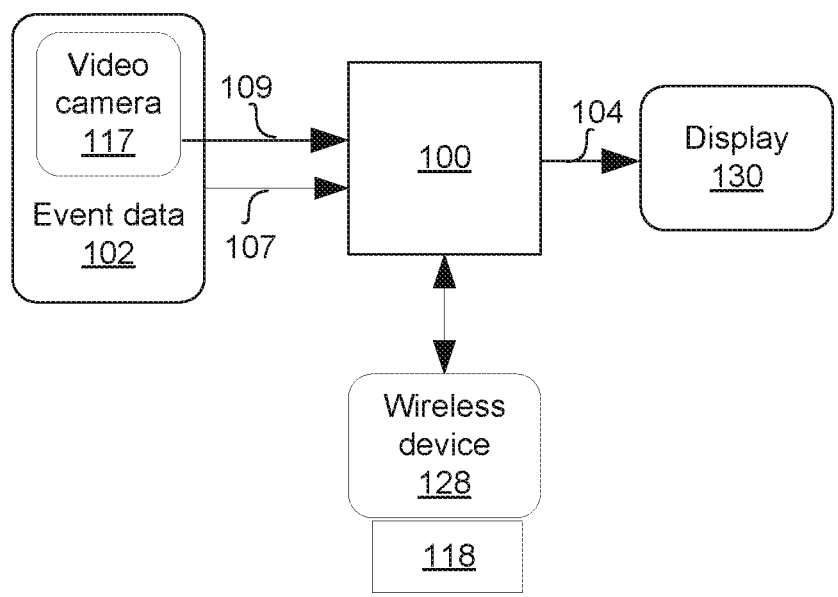
FIG. 9 is a diagram showing the use of a wireless device with the present system.

In certain embodiments, system 100 automatically transmits event characterization information to a recipient's wireless device, such as a mobile phone, net-book computer, or other portable wireless device, using UDP protocol, for example FIG. 9 is a diagram showing the use of a wireless, typically handheld, device 128 with the present system. Users may select which event characterization information and/or video/still images of an event are displayed on their mobile device 128. For example, a coach or a spectator may elect to view selected athlete performance parameters, or a spectator may select one of a number of video feeds, such as one that is covering the spectator's favorite athlete.

In one embodiment, user-configurable video feeds from one or more cameras 117 at an event facility may be broadcast throughout the facility. Users with handheld devices 128 may access the specific video feed of their choice via a wireless broadcast from system 100 or via a wireless communication system connected thereto. Coaches, referees, spectators, and commentators may also use handheld devices 128 to choose their own particular video feed from system 100.

Coaches and/or officials may also direct event characterization information and/or images to be displayed for training and/or reviewing purposes on a large display device 130, such as a stadium scoreboard. A coach may control video playback from the field using a handheld device 128 (such as a net-book or other portable computing device) and may select video or graphic displays for viewing during training sessions. Replays can be displayed on the handheld device, or on a larger display unit such as the stadium scoreboard 130.

In American football, a minimum of one referee is assigned to count the players on each team just prior to the snap of the ball. This is not only a difficult task to perform correctly, given the time constraints, it also deters this referee from watching other things immediately prior to the snap.

In one embodiment, system 100 continuously monitors the number of players on each team and notifies referees via handheld devices 128 (via a tone, vibrating mechanism, etc.) when either team has too many players on the field at the snap of the ball. The present method also provides coaches with real-time access to players on the field as well as with specific statistical data regarding their performance Event spectators using their own handheld devices, capable cell phones, etc., are provided access to a menu of data options that display information such as such as who is on the field, statistics, replays, and so forth.

Changes may be made in the above methods and systems without departing from the scope thereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A computer-implemented method for controlling a robotic camera to capture a target situation during a sporting event played by a plurality of participants, comprising:
    periodically receiving, from a tracking system, positions of the plurality of participants;
    processing the periodically-received positions to identify at least one condition, of one or more involved participants of the plurality of participants, that anticipates the target situation, the target situation involving the one or more involved participants; and
    controlling the robotic camera, when the at least one condition is identified, to zoom-in on and track the one or more involved participants based on the periodically-received positions, and to capture the one or more involved participants prior to and during the anticipated target situation.

2. The method of claim 1, the at least one condition being based on physical proximity between the involved participants.

3. The method of claim 2, the at least one condition being based on an identity of each of the involved participants.

4. The method of claim 3, the at least one condition being further based on a previous confrontation between the involved participants.

5. The method of claim 2, the at least one condition being based on an orientation of the involved participants relative to one another.

6. The method of claim 1, wherein:
    the at least one condition forms a prioritized list of conditions; and
    processing includes processing the periodically-received positions according the prioritized list to identify the at least one condition.

7. The method of claim 1, wherein:
    the one or more involved participants are two hockey players who had a previous confrontation;
    the target situation is a new confrontation between the two hockey players; and
    the at least one condition anticipating the new confrontation is based on physical proximity between the two hockey players and an identity of each of the two hockey players.

8. The method of claim 1, wherein:
    the one or more involved participants is one basketball player;
    the target situation is an attempted three-point shot; and
    the at least one condition anticipating the three-point shot is based on physical proximity of the one basketball player to a three-point line on a basketball court.

9. A system for capturing a target situation during a sporting event played by a plurality of participants, comprising:
    a robotic camera;
    a tracking system configured to periodically determine positions of the plurality of participants; and
    a computing device communicatively coupled with the robotic camera, the computing device including:
        instructions for processing the periodically-determined positions to identify at least one condition, of one or more involved participants of the plurality of participants, that anticipates the target situation involving the one or more involved participants; and
        instructions for controlling the robotic camera, when the at least one condition is identified, to zoom-in on and track the one or more involved participants based on the periodically-received positions, and to capture the one or more involved participants prior to and during the anticipated target situation.

10. The system of claim 9, wherein:
    the computing device stores the at least one condition as a prioritized list of conditions; and
    the instructions to process the periodically-received locations include instructions to process the periodically-received locations according to the prioritized list to identify the at least one condition.

* * * * *

UNITED STATES PATENT AND TRADEMARK OFFICE
CERTIFICATE OF CORRECTION

PATENT NO. : 10,420,981 B2
APPLICATION NO. : 15/816849
DATED : September 24, 2019
INVENTOR(S) : Douglas J. DeAngelis et al.

It is certified that error appears in the above-identified patent and that said Letters Patent is hereby corrected as shown below:

On the Title Page

Item (63) Related U.S. Application Data and continued to page 2 "Continuation of application No. 14/968,064, filed on Dec. 14, 2015, now Pat. No. 9,849,334, which is a continuation of application No. 14/330,838, filed on Jul. 14, 2014, now Pat. No. 9,216,319." should read
-- Continuation of application No. 14/968,064, filed on Dec. 14, 2015, now Pat. No. 9,849,334, which is a continuation of application No. 14/330,838, filed on Jul. 14, 2014, now Pat. No. 9,216,319, which is a continuation of application No. 12/985,036 filed Jan. 5, 2011, now Pat. No. 8,780,204 --

Signed and Sealed this
Thirteenth Day of September, 2022

Katherine Kelly Vidal
*Director of the United States Patent and Trademark Office*